United States Patent
Slot et al.

(10) Patent No.: US 8,207,691 B2
(45) Date of Patent: Jun. 26, 2012

(54) METHODS AND APPARATUS FOR OPERATING GROUPS OF HIGH-POWER LEDS

(75) Inventors: Machiel Slot, Richmond Hill (CA); Antonius Jacobus Maria Cremer, Oisterwijk (NL)

(73) Assignee: EldoLAB Holding B.V., Eindhoven (NL)

( * ) Notice: Subject to any disclaimer, the term of this patent is extended or adjusted under 35 U.S.C. 154(b) by 700 days.

(21) Appl. No.: 11/910,755

(22) PCT Filed: Apr. 7, 2006

(86) PCT No.: PCT/NL2006/000182
§ 371 (c)(1),
(2), (4) Date: Jan. 11, 2008

(87) PCT Pub. No.: WO2006/107199
PCT Pub. Date: Oct. 12, 2006

(65) Prior Publication Data
US 2008/0191642 A1     Aug. 14, 2008

(30) Foreign Application Priority Data

Apr. 8, 2005    (NL) ..................... 1028728
Sep. 5, 2005    (NL) ..................... 1029884
Sep. 13, 2005   (NL) ..................... 1029943

(51) Int. Cl.
*H05B 37/02*     (2006.01)
(52) U.S. Cl. ......... 315/360; 315/210; 315/246; 315/307
(58) Field of Classification Search .............. 315/209 R, 315/210, 224, 246, 291, 307, 312, 360
See application file for complete search history.

(56) References Cited

U.S. PATENT DOCUMENTS 4,017,847 A    4/1977   Burford et al.
(Continued)

FOREIGN PATENT DOCUMENTS

EP    0 967 590 A1    12/1999
(Continued)

OTHER PUBLICATIONS

"AVR242: 8 bit Microcontroller Multiplexing LED Drive and 4 × 4 Keypad", Atmel Application Note, 1231B-AVR-05/02, 2002.
(Continued)

Primary Examiner — Thuy Vinh Tran
(74) Attorney, Agent, or Firm — Hoffman & Baron, LLP

(57) ABSTRACT

The object of the invention is to implement an energy-efficient, compact and cost-effective solution for driving a number of high-power LED groups for lighting applications, by using a single switching power supply together with LEDs connected in series and/or in parallel and pulse width-controlled switches in parallel across the individually controllable LED groups. If the switch of an LED group is ON, the LED group will not light up. If the switch is in the OFF position, the full current of the power supply will pass through the corresponding LED group. Another aspect of the invention is the restriction within the drive protocol, according to which but a single switch is actuated at any one time within a particular time interval. This aspect guarantees a minimum time interval between each individual actuation event. Another aspect is the derating of the power supply in those phases where not a single LED group is ON. In the event of all the switches being closed (all LED groups OFF) the power supply can be derated (or turned off). A further aspect is the use of an elevated current setting of the power supply with the simultaneous restriction of the ON cycle by means of pulse width modulation. The power supply is set to the maximum instantaneous peak current of the LED, while maximum pulse width drive guarantees a maximum of the average LED current, cycle time being left over as a result, thus enabling more LEDs to be driven at a given supply voltage.

22 Claims, 23 Drawing Sheets

U.S. PATENT DOCUMENTS

| | | | |
|---|---|---|---|
| 5,010,459 A | | 4/1991 | Taylor et al. |
| 7,023,147 B2 * | | 4/2006 | Colby et al. ............... 315/291 |
| 7,088,334 B2 * | | 8/2006 | Adachi et al. .............. 345/102 |
| 7,129,652 B2 * | | 10/2006 | Patel et al. ................ 315/291 |
| 7,248,245 B2 * | | 7/2007 | Adachi et al. .............. 345/102 |
| 7,420,335 B2 * | | 9/2008 | Robinson et al. ........... 315/224 |
| 2002/0105373 A1 | | 8/2002 | Sudo |
| 2002/0171365 A1 | | 11/2002 | Morgan et al. |
| 2004/0017164 A1 | | 1/2004 | Belliveau |
| 2004/0090403 A1 | | 5/2004 | Huang |
| 2004/0195978 A1 | | 10/2004 | Horiuchi et al. |
| 2006/0038803 A1 * | | 2/2006 | Miller et al. ............... 345/204 |
| 2006/0103612 A1 | | 5/2006 | Osaki |

FOREIGN PATENT DOCUMENTS

| | | | |
|---|---|---|---|
| EP | 1503429 A1 | 2/2005 | |
| EP | 1564821 A1 | 8/2005 | |
| JP | 9081211 A | 3/1997 | |
| JP | 11-032278 A | 2/1999 | |
| JP | 11-119733 A | 4/1999 | |
| JP | 2003-332623 A | 11/2003 | |
| JP | 2004-207411 A | 7/2004 | |
| JP | 2004-311461 A | 11/2004 | |
| WO | WO 2004/100612 A1 | 11/2004 | |
| WO | 2006/080365 A1 | 8/2006 | |

OTHER PUBLICATIONS

Office Action for Japanese Patent Application No. 2008-505247, mailed Oct. 19, 2011.

Extended European search report for Application N 10191577.5, dated Nov. 18, 2011.

English (Machine) Translation of Japanese Publication No. 11-032278, Feb. 2, 1999.

English (Machine) Translation of Japanese Publication No. 11-119733, Mar. 4, 1999.

English (Machine) Translation of Japanese Publication No. 2003-332623.

English (Machine) Translation of Japanese Publication No. 2004-207411.

English (Machine) Translation of Japanese Publication No. 2004-311461.

English abstract of JP-9081211 A, Sep. 14, 2007.

* cited by examiner

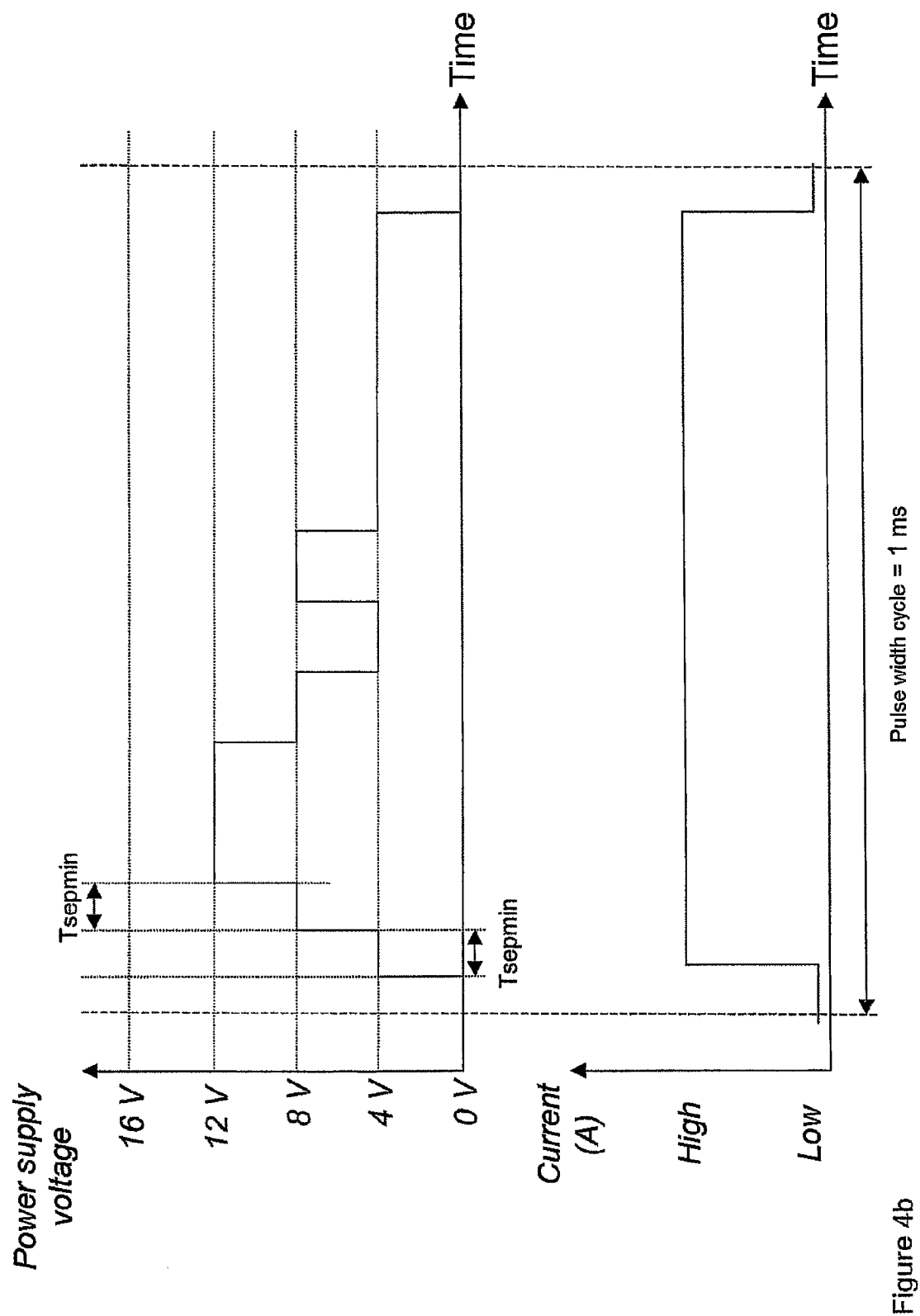

METHODS AND APPARATUS FOR OPERATING GROUPS OF HIGH-POWER LEDS

CROSS-REFERENCE TO RELATED APPLICATIONS

This application is the National Stage of International Application No. PCT/NL2006/000182, filed Apr. 7, 2006, which claims the benefit of Netherlands Application Nos. NL 1028728, filed Apr. 8, 2005, NL 1029884, filed Sep. 5, 2005 and NL 1029943, filed Sep. 13, 2005, the contents of all of which are incorporated by reference herein.

FIELD OF THE INVENTION

The invention relates to methods and apparatuses for electronically driving LEDs for lighting applications.

BACKGROUND OF THE INVENTION

Light fittings frequently make use of high-power LED technology as the light source. The light yield of an LED is directly related to the current passing, through it, a qualitative power supply being necessary for a controlled quantity of light which, for example, is temperature-independent. Control of the light yield is implemented by means of adjustable power supplies or by means of pulse width driving in conjunction with a fixed power supply setting. A number of LEDs can be connected in series and/or parallel from a single power supply, necessitating a higher supply voltage and/or supply current, but avoiding the cost of additional power supply (supplies). Special lighting applications, for example architectural illumination and discotheques, make use of so-called R(ed)G(reen)B(lue) fittings, in recent times often extended to include white LEDs, because of the additional colour dynamics. These RGB and RGBW fittings are used as static illumination with a specific, set colour mix or alternatively as dynamic illumination using lightshow control techniques.

FIG. 1 shows an example of a present-day RGB implementation. For each LED group colour (Red, Blue and Green), this figure shows the pulse width drive switches S1-S3 with associated power supplies PS1-PS3. If the switch S1-S3 of a power supply PS1-PS3 is in the ON position, the power supply PS1-PS3 will send a defined current through the associated LED(s). One characteristic is that each LED has a defined forward voltage drop, which means that each power supply PS1-PS3 is able to drive at most as many LEDs within one circuit as limited by the supply voltage V which is usually subject to the "safe to touch" requirement. The way this works for a light setting is that for a particular brightness and cc lour setting the pulse width PW1-PW3 for each LED colour is adjusted so as to ensure that said desired setting is achieved.

Simple high-power LED lighting products employ inexpensive linear power supplies, sometimes comprising a simple resistor. At lower light intensity settings, however, a linear power supply leads to inefficient use of energy, owing to heat dissipation in the power supply. Moreover, a dissipating power supply also adds a dissipative loss to the light yield which in any case has already been restricted by a dissipation budget: the LED light from a fitting is limited, inter alia, by the cooling capacity of the fitting. The solution is that energy-efficient products make use of switched power supplies which can have an energy efficiency of more than 90%. Many applications now employ switched power supplies, but there are a number of problems which hinder and even restrict the wider application of this solution.

Energy-efficient switching power supplies consist of a switching voltage source using, as feedback, the measured output current instead of the usual output voltage. The switching power supply and current feedback circuit are relatively bully owing, in particular, to the use of current-carrying coils, high-frequency capacitors and flyback diodes. The occupied volume, for a 350 mA LED current is about 3 to 4 $cm^3$ per power supply. A present-day solution in the case of RGBW then requires 4 power supplies. The additional volume required by the power supplies, on top of the volume already necessary for the other components of a lighting drive arrangement demands such a large overall volume that as a result at this time the solutions on the market consist of separate modules for the drive arrangement and the fitting. This design restricts a large number of applications requiring more highly integrated solutions such as ceiling lighting, cove lighting and "light-on-a-stick", with the problems varying from unaesthetic design limitations to simply insufficient installation space for accommodating the drive arrangement.

In the case of separate modules for driving and fitting a distribution of components between drive arrangement and LED groups, such as connection contacts C1-C4 is shown in FIG. 1. Only the LEDs are then still located in the fitting, all the other parts of the drive arrangement being located in a separate module. This results in problems relating to the electromagnetic interference (EMI) of this way of partitioning, owing to the RF modulation of the connecting cables between LEDs and drive arrangement. This results from the high switching currents and associated voltage peaks, which worsen as a function of the cable length. This problem is further aggravated as the LED currents increase with new generations of high-power LEDs. Furthermore, the total LED current of all the groups comes together in a common point C1 (FIG. 1) and associated cable, as a result of which the cable currents and component requirements (e.g. connector) at that single point quadruple in the case of RGBW. Quadrupling of the current, as a consequence of $I^2R$ means that power-related requirements are multiplied by a factor of 16.

For an RGB(W) fitting, the large number of power supplies gives rise to an expensive solution resulting from the power supply costs, the multimodule design and associated more expensive cabling. For many applications, these costs constitute a further restriction of the use of LEDs as lighting sources.

From another field of application (display lighting) solutions are known for the low-power LEDs to be driven to be connected in series with one parallel transistor for each LED. If the transistor of an LED is in a conducting state (low-resistance), the current will not pass through the LED (as these demand a higher minimum of voltage to be supplied before an LED current is produced), but only through this transistor: this LED therefore does not give any light. If the transistor is not in a conducting state (high-resistance), virtually all the current will pass through the LED of this transistor, which therefore will give off a quantity of light defined by the power supply.

Concrete examples are described in JP 09081211 and U.S. Pat. No. 4,017,847. As described, all the LEDs are connected in series with transistors parallel thereto. The LEDs connected in series are fed by means of a single power supply. The claimed advantage is a lower total current consumption (at a higher supply voltage). Another example is described in U.S. Pat. No. 4,783,897 and has a similar design: a driven transistor parallel to each LED connected in series. This patent has an additional claim according to which the power supply is not run in the event of all the LEDs being OFF, thereby giving rise to less dissipation for the linear power supply As discussed earlier, an energy-efficient, compact and cost-effective solution for driving high-power LEDs for lighting applications demands a switched power supply in conjunction with a pulse width drive arrangement for each LED group. The existing display illumination solutions, however, have in common that they are conceived for single-colour semistatic low-power LED applications such as display background illumination and display indicator illumination. These display illumination solutions cannot, without being modified, solve the problems caused by a dynamic pulse width drive arrangement for high-power multi-LED group lighting owing to the following implementation problems:

The high-power LEDs employ high-intensity currents (0.35-1 amps) in combination with high operating voltages (3.5-4 volts), as a result of which energizing and de-energizing events result in relatively large changes in voltages as a function of time (dV/dt) and relatively large changes in current as a function of time (dI/dt), as a result of, in particular, cable-related parasitic coils and capacitors. Furthermore it is advisable, to avoid dissipation in e.g. a MOSFET switch, to switch the current rapidly in order for the MOSFET to be subject to a high ohmic resistance for as short a time as possible: this, after all, results in $I^2R$ dissipation. This effect is further increased if the LEDs are additionally connected in series and/or parallel in one group, since the voltage and/or current required will then increase. Furthermore, a MOSFET switch will also a require a decoupled "floating" drive arrangement which, however, additionally results in a parasitic capacitance between the MOSFET drive arrangement and the LEDs (like the high edge of an H bridge). The use of, for example, 4 LED group drive arrangements in series will therefore lead to a complex current management in the case of an entirely independent pulse width drive arrangement for each group. In principle, each group in the existing display illumination solutions can be actuated at a random instant and it is therefore possible, in the event of e.g. 7 LEDs being actuated simultaneously, for changes in voltage and current in the order of 1 A and 28 V (7 times 4 V) to occur within a few microseconds. This is further aggravated in the case of a switching power supply which in principle will make an additional contribution to the actuation-induced high voltages and current peaks. In the case of the high-power LEDs the display solutions for RGBW will not, owing to the said actuation effects, result in a stable circuit producing qualitatively definable quantities of light per LED group.

As a result of all the current and voltage peaks, available components will often not be able to handle the high current and/or voltage peaks, and additional components would be required to dispel these overdriving problems. These additional components would result in increased volume and cost price, thereby soon negating the advantage of a single power supply.

The pulse width drive principle necessitates the ability to turn a power supply on and off rapidly, to achieve a drive resolution which is sufficient for the desired dynamic light contrast. This resolution leads to relatively high bandwidth requirements for the power supply, at least several tens of kHz. Given a particular implementation, a high-bandwidth switching power supply will still have a limited dV/dt (with respect to component limitations, but also in terms of control stability), and the response rate of a power supply will differ depending on how many LEDs are actuated simultaneously. For example: turning two LEDS on takes e.g. 5 μs, whereas 20 μs are required to turn four LEDs on, since twice the output voltage has to be built up before the desired current is achieved. The fact that there is interaction between the number of LEDs simultaneously actuated and the total effective current through these LEDs (i.e. light yield) results in undesirable cross-links and possibly in oscillation between the drive arrangements of the various LED groups, as a result of which a display solution will not afford a properly operating circuit.

In the event of simultaneous actuation of many LEDs, the supply load against time will also exhibit peaks which pose exacting requirements in terms of cable shielding, as discussed earlier.

SUMMARY OF THE INVENTION

It is an object of the invention to provide an improved drive arrangement for LED groups which overcomes, at least in part, one or more of the above-described drawbacks.

This object can be achieved by means of a method of driving, by means of single power supply, a number of high-power light-emitting diodes (LEDs), said number of LEDs being divided into two or more groups, each group being separately energizable, said method comprising: a) energizing or de-energizing of a supply current from the power supply into a first one of the groups; b) waiting during a predetermined wait time period; and c) repeating step a) and b) for a second one of the groups.

Waiting for a wait time period (also referred to as time period in the present document) prevents the power supply from having to accommodate the energization or de-energization of two or more groups simultaneously. The fact is that the inventors have realized that the supply current being turned on or off by one or more groups entails the need for the power supply to adapt to an altered load situation. Assume, for example, that the groups are connected in series and the de-energization of a group takes place by short-circuiting said group by means of a switch positioned in parallel to the group: this then means that upon de-energization of a group an output voltage of the power supply changes, as equally happens if a group is energized. If two or more groups now were to be energized or de-energized within a relatively short time, this will mean that the power supply will thus need to control a multiple of a change in load, compared with the situation that only a single group is energized or de-energized. Because the power supply is now able to adjust more rapidly to the altered situation in terms of the load, this means that a variety of advantages can be achieved: thus, a higher resolution in terms of energization and de-energization times can be achieved by a more rapid response of the power supply, instabilities in the control arrangements of e.g. the power supply can be prevented, and effects of parasitic capacitances, switching losses, etc. can be minimized. The wait time period preferably corresponds to a rise time or fall time of the power supply in the event of a single group being energized, so that a subsequent group can be actuated within as short a period of time as possible after actuation of a previous group.

In order to achieve a desired intensity of a group, the de-energization of an energized group can take place in accordance with a desired average current in the energized group. Owing to the inertia of the human eye, a variation in light intensity of a group can be achieved by modulating a time over which the group in question is ON, thus allowing the de-energization instant to be chosen so as to ensure that the desired average current corresponding to the desired intensity will pass through the group in question.

It is further possible for the method to be characterized by the further steps of: d) determining, prior to step a), of a sequential order by classifying the groups on the basis of a rising or falling desired average current; and wherein step c) comprises: c1) performing steps a) and b) in the energization sequential order for each of the groups to be energized. Energization and de-energization can be distributed over time, which on the one hand can have a positive effect on interference signals emitted by a drive arrangement of the groups (for example as a result of the actuation), and on the other hand, especially if the method is implemented by a programmable device such as a microprocessor, microcontroller or the like, allows the execution of the steps for energization and de-energization, respectively, of the groups in question to be distributed as far as possible over time, thus allowing any instantaneous load on the microprocessor, microcontroller and the like to be kept as low as possible. On the one hand this provides the option of making use of a simple microprocessor or other processing unit having a low processing speed, and on the other hand this provides the option, for example, of also employing the microprocessor, microcontroller and the like in question for other tasks.

In the last-mentioned example it is also possible for, prior to d), among the groups a subset comprising groups to be excluded from step d) and step c1); and c2) wherein it is determined, after energization according to c1), whether a remaining time up to a next de-energization of one of the groups energized at c1) is at least two wait time periods longer than a desired pulse duration of a group from the subset; c3) if this is the case, the energization of the relevant group from the subset and de-energization thereof after the desired pulse duration has elapsed; and c4) repeating of step c2) and c3) as long as not all the group from the subset have been ON during the desired pulse duration. The subset can comprise, for example, the groups whose desired pulse duration is shorter than a total number of groups multiplied by the wait time period, but other criteria can also be applied. In general, those groups will be excluded whose pulse duration is relatively short. This is because it is thus possible to prevent additional groups from being energized at any time while in fact at that very time a group that needs to be alight for only a very short time should already be deenergized. This could result, for example, in a load on a control unit such as the abovementioned microprocessor and the like increasing to too high a level for actuation, or other undesirable actuation effects could occur as a result of energization and de-energization of groups possibly running into one another in an undesirable manner. The groups whose energization duration, in other words a desired pulse duration, is short can be energized at the instant when a remaining time up to a subsequent actuation action of one of the previously energized groups is sufficiently long to allow the relevant pulse of one or more of the "brief" pulses to be rounded for the next de-energization of one of the "long" groups. If after de-energization of all the "long" groups, in other words all the groups energized at c1), one or more groups from the subset proves to be left over, the remaining groups can be turned ON for the desired pulse duration in accordance with steps a) and b).

As described elsewhere in more detail in this document, the magnitude of the supply current of the power supply can instantaneously be larger than a maximum peak current of an arrangement of the LEDs in the group (incidentally, preferably without in the process exceeding an average maximum peak current, specified e.g. by a manufacturer of the LEDs during a specified peak current time), thus allowing, within a defined time period and within a defined maximum voltage across the groups connected in series, a larger number of groups to be operated by driving the LEDs, in fact in turn, over short times using currents which can exceed the specified maximum peak current.

It is further possible for a point of time of energizing and or deenergizing of the groups further to be determined by means of one or more modulation techniques from pulse width modulation (PWM), frequency modulation (FM), pulse code modulation (PCM) and time division modulation (TDM). By making use of one or more of these modulation techniques it is possible to achieve an advantageous manner of distributing actuation events over a period of time, which can be translated, for example, into enhanced stability of the power supply, reduced mutual cross-talk between groups of LEDs at the actuation instant, reduced emission of radio-frequency radiation (RF), and a more uniform distribution of actuation instants and consequently of radio-frequency emission over time.

In addition to the above-described variants which involve energization or de-energization followed by waiting for a wait time, it is also possible for a previously energized group to be de-energized at the same time as a subsequent one of the groups is energized. In effect this means that the power supply will experience no change, or only a very small change, in load, since thus, in effect, one energized group is replaced by another group to be energized. This means that it is thus possible to implement more actuation instants for the groups as a whole, thus making it possible for a higher resolution to be achieved within a particular time period, since there is more freedom with respect to the times at which an individual group is energized and de-energized, by combining energization and de-energization of separate groups.

This principle can be applied, for example, in an embodiment in which use is made of:
e) dividing of a cycle for energizing and de-energizing the groups into a number of equal portions, the number being equal to the number of groups;
a3) energizing of a first one of the groups at the start of one of the portions of the cycle; and wherein step a2) comprises:
a4) energizing of a second one of the groups at the start of another portion of the cycle, the first group being de-energized simultaneously with energization of the second group. Thus, as described hereinabove, actuation of groups can take place at the same instant, and it is furthermore possible to achieve a desired intensity by the group in question, for example in successive cycles, being switched ON or not being switched ON on the basis of one or more of the abovementioned modulation techniques. Thus it is possible, for example, for each of the groups to be assigned one or more portions of the cycle, where the groups, depending on the modulation chosen and the desired intensity, may or may not be turned ON in the portions or portion assigned thereto. A further refinement of this embodiment can be achieved by the steps of turning one or more of the groups ON and OFF by means of steps a) and b) during one of the parts of the cycle, each of the groups being assigned a different part of the cycle. By thus assigning each of the groups a part of the cycle for turning ON and OFF during a part of the cycle in question it is possible to achieve a further increase in resolution, the action of allowing or not allowing groups to remain ON during an entire time period of one or more of the equal portions being supplemented by the action of allowing a group to remain ON during a relatively short time period in a part allocated thereto of the cycle. Mutual conflicts between the groups can thus likewise be avoided, since for the purpose of "fine control" of this type each group is assigned a different part of the cycle.

The power supply can comprise a switching power supply, which in the present document may also be referred to as a switched power supply. To achieve rapid adjustment of the switching power supply to a change in load as a result of actuation of groups, the control arrangement of the switching power supply can be synchronized with actuation of the groups.

It is further possible for a digital communications interface to be used for transmission of a desired ON time, intensity or actuation time or other parameters, thus making it possible, for example, to drive a large number of groups by means of a single communications interface.

As the human eye has a sensitivity which exhibits certain logarithmic behaviour, it is advantageous for the intensity transmitted via the interface to comprise logarithmic coding. It is thus possible, for example, for the same resolution observable by a user to be transmitted via the communications interface by means of a smaller quantity of data.

Also, each group is preferably connected to an actuation element for energizing the connected group of LEDs and each actuation element is connected to a control unit, and the method further comprises controlling, as described hereinabove, at least one actuation element for energizing or de-energizing the group of LEDs connected to said activation element. The control unit can be provided with a time control element, and control of an actuation element can comprise actuation of but a single actuation element within the predetermined wait time period. The said wait time period can correspond to the rise time or fall time of the power supply in the event of an LED group being actuated as already described hereinabove.

As already mentioned hereinabove, it is preferable to mike use of a switching power supply. A switching power supply can comprise a switching voltage source, using the measured output current instead of the output voltage for feedback. This has the advantage of considerably lower dissipation than entailed by the use of linear power supplies, also resulting in a lower cooling capacity required. In the case of a cooling capacity limited by the fitting this does effectively afford a higher capacity for an increased light yield.

As stated, it is possible to make use of a single power supply with LEDs placed in series and/or in parallel and pulse width-controlled switches in parallel across the individually controllable LED groups. If the switch is in the ON position, the LED group will not light up, as the minimum voltage of LEDs will be well above the voltage drop of, for example, a MOSFET. If the switch is in the OFF position, the full current from the power supply will pass through the LED group. The aspect of a single power supply ensures that overall a compact and cost-effective implementation is achieved, compared with an implementation having a number of (bulky and expensive) power supplies, with the additional advantage of higher voltages in conjunction with lower currents; an $I^2R$ advantage. In such an arrangement, stable operation of the unit requires a possible switched (nonlinear) power supply to have a considerably higher control frequency than the pulse width modulation, to avoid undesirable oscillation interaction between the two control loops. This can be achieved by using, for example, 1 kHz for the pulse width modulation and 200 kHz as the switching frequency for the power supply—characteristic frequencies of prior art LEDs and switching power supply components.

In the case of a plurality of LED groups with only a single switch at a time being actuated within a predetermined time interval, a restriction can be applied to drive protocol. The principle involves the fact that a minimum time interval (Tsepmin) is guaranteed between each individual actuation action. Tsepmin is defined as the minimum time interval sufficient for the rise and fall times of the power supply in the case of a random LED group being energized or de-energized (for a 7 LED RGBW solution on 350 mA, Tsepmin is in the order of from 10 to 20 µs). The "single actuation action per Tsepmin" restriction to the drive protocol first of all ensures that the switching power supply and the LED group switches thus cause far fewer actuation-induced voltage and current peaks, that actuation of high-power LEDs with a number of groups in series in reality is achievable only if the peaks are limited to the effects of actuating a single group instead of two or more groups. Secondly, this restriction ensures that the power supply (and thus the light yield) is stabilized before the possible actuation of other switches, and the restriction thus avoids cross-connections between the various LED groups. Thirdly, there is an improvement in cost price, since measures to increase the current or voltage peak tolerance can be avoided. Fourthly, the distribution of actuation instants over time results in lower electromagnetic interference and in reduced current peaks in the feed lines of the lighting arrangement. Finally, this drive principle ensures that driving by means of software-based pulse width modulation can be simplified, as the computational load is distributed over time, thus making it possible to employ simpler and less expensive central processing units.

It is further possible for the power supply to be derated or turned off in those phases where not a single LED group is in the ON state. In the case where all the switches are closed (all LED groups OFF) the power supply will want to build up the complete current from the (low) resistance of the switches. To avoid this partial dissipation, the power supply can be derated in this phase. At the same time, switched power supplies (usually based on integrated circuits for switching voltage sources) are subject to limitations in terms of stability at low output voltages, and derating (and even temporary disconnection) of the power supply will result in improved stability.

It is also possible to make use of a higher current setting of the power supply and at the same time to restrict the ON cycle by means of employing, for example, pulse width modulation or another modulation technique. The power supply is set to the maximum instantaneous (peak) current of the LED, while pulse width control is used to ensure that the average current will not exceed the maximum average current of the LED. For present-day LEDs, the ratio between the maximum and the average current is about 1.4, at a pulse width frequency of 1 kHz. This means that a pulse width of 700 µs per 1 ms at the maximum instantaneous peak current of the LED will on average yield the maximum average current, and the remaining 300 µs can be used to drive more LEDs at the same supply voltage. In effect this makes it possible, for example, to feed 4 groups of a total of 8 LEDs, where previously this could have been done with no more than 6 LEDs, based on the maximum average current from 24 V (6 times 4=24 volts).

To achieve an intensity which is as constant as possible to an observer in the event of any change in the pulses, a move being made, for example, from a cycle comprising a number of short pulses to a cycle comprising a single long pulse which replaces the short pulses, it is possible for one of the groups to be retained in the energized state for a comparatively longer period in a cycle during which few others are energized for a relatively shorter time [lacuna] of the group in question will occur. This is advantageous, in particular, in combination with the various preferred embodiments in which use is made of a combination of long and short pulses: the long pulses in such a case afford coarse resolution (coarse setting) for driving the LED, while the short pulses provide a fine adjustment. In the event of a transition in intensity from a low level which is provided by a number of short pulses to a level at which a longer pulse is employed, a discontinuity may occur which a user may observe in the form of linking, flicker and the like, which can be largely avoided by means of the herein-described preferred embodiment.

In a further preferred embodiment it is possible to measure a light intensity by means of a photosensor and to provide feedback by using the measured light intensity to adjust a magnitude of the supply current of the power supply or to adjust an actuation instant of a group. The photosensor can be employed to provide adjustment to an external light condition in the case where the photosensor mainly measures the external light condition. The external light condition may comprise, for example, an intensity, a colour or a colour distribution or the like. It is also possible for the sensor to measure the light intensity of illumination provided by one or more of the LEDs, thus making it possible to obtain feedback to stabilize an intensity to be provided. Via the feedback, the sensor can act on the magnitude of a current from the power supply or on an actuation instant. To provide feedback for a plurality of groups with a single sensor, a feedback signal for a separate group can be provided by making use of the fact that in many embodiments time periods can be found during which only a single group is energized. If the sensor and corresponding read-out thereof is sufficiently fast, this can be taken advantage of by measuring during such a time period in which only the group of LEDs in question is energized.

The methods and apparatuses described in the present document, can also be employed to transmit information by means of actuating one or more of the groups as a function of a modulating signal. The modulating signal may here represent an information item which can be transmitted by means of a multiplicity of modulation techniques known to those skilled in the art, comprising FM, PWM, PCM, AM and many others. Within the scope of the invention it is also possible to combine illumination and information transmission. If in such an arrangement the modulation takes place at a rate above that of the human eye, an observer will not suffer any discomfort as a result.

Within the scope of the present document, the term "high-power LEDs" can refer to any light-emitting diode or a different type of light-emitting semiconductor element in a lighting application. In addition, an LED which modulates in a wavelength region outside the spectrum visible to the human eye (for example infrared or ultraviolet) can also be encompassed by the term "high-power LED".

The invention as described hereinabove can be used in a supply unit, a light unit and a lighting system.

The abovementioned techniques can be employed independently of one another. Within an embodiment, one or more of the abovementioned techniques can be combined to obtain a combination of the advantages appertaining to the various techniques.

BRIEF DESCRIPTION OF THE DRAWINGS

The invention will now be explained in more detail with reference to the accompanying drawings, in which:

FIG. 4b shows a time diagram of the current and the voltage of the power supply according to the control schedule of FIG. 4a;

DETAILED DESCRIPTION OF PREFERRED EMBODIMENTS

Figure 2:
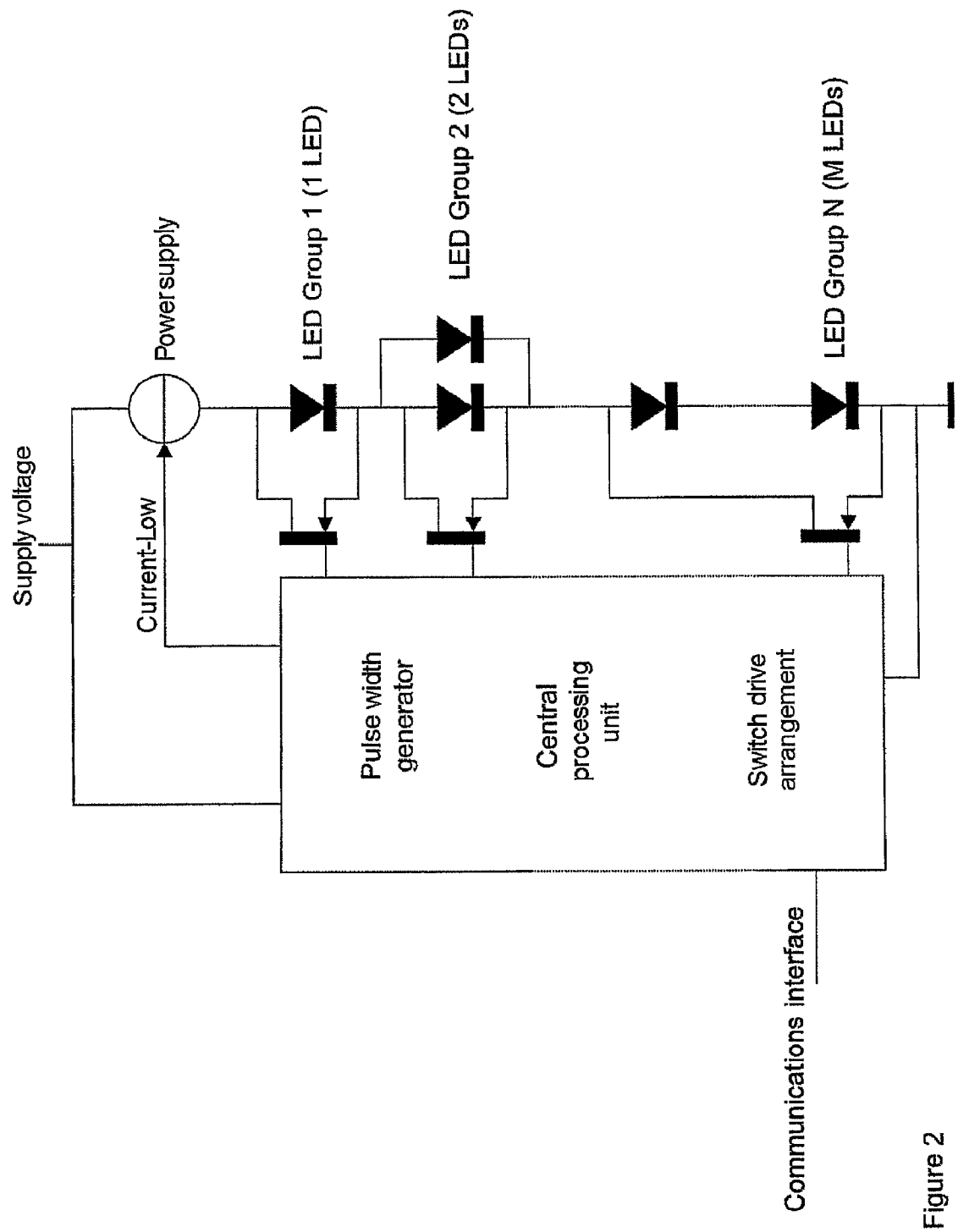
FIG. 2 shows a schematic depiction of an embodiment of a circuit for operating groups of LEDs according to the present invention.

FIG. 2 shows a single power supply PS comprising N LED groups which are individually driven from a central processing unit (CPU). The number of LEDs that can be simultaneously ON is determined by the supply voltage divided by the maximum summed forward voltage of the LEDs. The CPU includes a clock which is sufficiently accurate to enable time control at adequate pulse width resolution (for example 10 bits at 1 kHz, i.e. 1 ms divided by 1024: ~1 μs. The CPU in this example controls the MOSFET switches by means of software, using a software-based pulse width generator, but a hardware-based generator is also an option. The power supply PS in this example has two fixed current settings; one for when at least one group is active, and a low current setting (or even OFF) if not a single group is active. The power supply PS can be an energy-inefficient linear (resistor or current-set transistor) or an energy-efficient switched version. A switched power supply PS consists of a current-feedback power supply which in principle consists of a pulse width-driven switch which is usually based on an integrated circuit and comprises a coil, flyback diode and a storage capacitor. In the case of a switched power supply PS it is necessary for the power supply PS to have a considerably higher regulating frequency than the pulse width modulation, to avoid undesirable oscillation interaction between the two loops. In addition to this example comprising two fixed current settings, another option is to implement the CPU with a dynamic current drive arrangement.

The drive arrangement of the switches determines whether individual LED groups are active. In this example the switch is formed by a MOSFET, because of the low Rds-on (ON resistance) and actuation speed, but in principle, a transistor or even an (electronic) relay would be among the possible options. If a switch is ON, the current from the power supply will pass through the switch and not through the LEDs. If a switch is OFF all the current will pass through the LEDs, which will then light up. To avoid voltage and current peaks, the LED groups are driven in such a way, by means of a (hardware or software) algorithm that only one switch is actuated in each time interval. An example of an algorithm follows hereinafter. The drive protocol of the LEDS over time can be static or dynamic (lightshow). A dynamic drive protocol can comprise an autonomous software routine which drives a local lightshow. On the other hand, the drive instructions can also be driven by a communications interface. In yet another embodiment it is possible for a single light fitting among a set of such fittings to be appointed to coordinate a lightshow towards the other fittings (master/slave) by means of a bidirectional communications interface. The protocols for the communications interface can take many forms, for example direct control information for each colour and each unit of time, or parameterized instructions. The communications interface can consist of a galvanic, optical or RF link for data transmission purposes.

In the example, one LED group shown includes a single LED, one group includes two LEDs connected in parallel, and one LED group shown includes M LEDs. In the LED group connected in parallel, the current will be split for each LED in this group, into two equal parts in the case of LEDs specially selected for this purpose (a customary principle in LED illumination). Allowing for component, current and voltage restrictions, the drive principle can be used in any combination of LED groups and LEDs in each group connected in parallel and in series.

Figure 3:
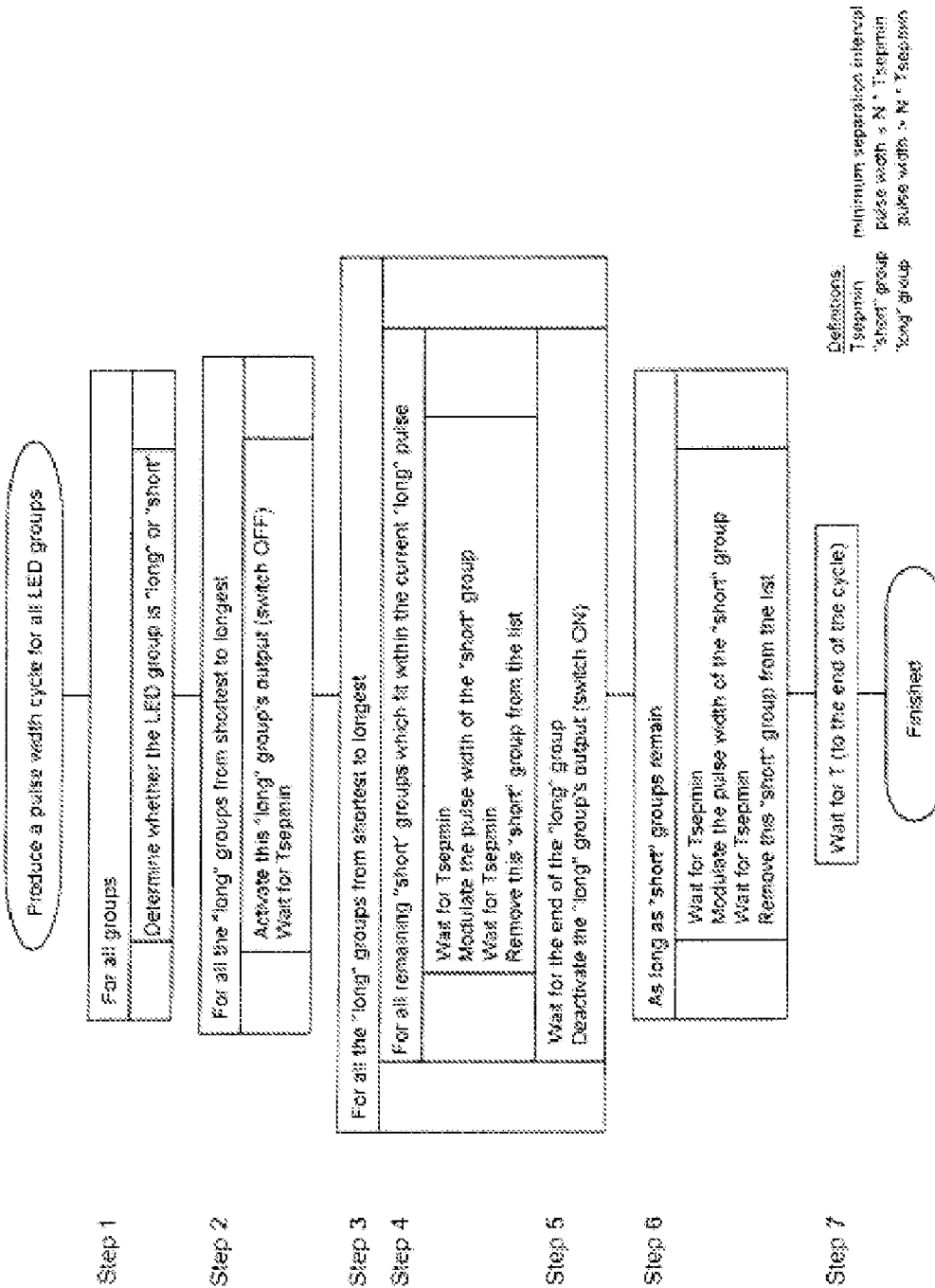
FIG. 3 shows a block diagram comprising steps for a method according to an embodiment of the invention.

FIG. 3 shows a flowchart of the pulse width-based drive algorithm which requires just a single actuation step per separation interval Tsepmin. Tsepmin is defined as the minimum time interval sufficient to accommodate the rise and fall times of the power supply in the case of a randomly selected LED group being energized or de-energized. This means that Tsepmin essentially corresponds to the rise or fall time of the power supply when the largest LED group connected to the power supply is energized or de-energized, respectively. This ensures that the current and the power supply have stabilized after a first LED group has been activated, prior to actuation of a second LED group.

FIG. 3 relates to an algorithmic example for N groups, many other algorithms being possible to achieve the same objective (at most one actuation event per interval Tsepmin). Moreover, various implementations of this algorithm are possible, for example by sorting from high to low instead of the other way round as in the example. The algorithm example is defined so as to demand 100% of the CPU load. By redefining the implementation on an interrupt basis it is possible to re-use the stated wait times for other processor tasks such as external communication. Furthermore, it has now also been formulated in such a way that within each pulse width cycle all the results for a particular setting must be recalculated, but this can be avoided by storing the results for reuse in the following cycles.

The algorithm for driving N LED groups consists of the following steps for each pulse width cycle, the starting point being that all LED groups are OFF (see FIGS. 4a and 4b for a concrete drive protocol example):

1. Determine whether the pulse width drive protocol desired for each LED group is "long" or "short". Long or short is defined by determining for each group whether the ON pulse width is longer or shorter than N*Tsepmin. The desired pulse width of each LED group is obtained from a static setting or dynamically (for example a lightshow) is a function of time.

2. Turn all the "long" groups ON, sorted from short to long, with an interval Tsepmin between the actuation instants. An LED group is turned ON by placing the corresponding switch in the OFF position. The minimum separation interval is achieved by causing the CPU to wait for the duration Tsepmin in response to a clock source.

3. Perform steps 4 and 5 for all the "long" groups (from short to long).

4. As long as "short" groups remain and there is a room for a "short" pulse within the present "long" ones: modulate the next "short" pulse. At least (N+2)*Tsepmin is required, in terms of space, for a "short" pulse of at most N*Tsepmin with an interval Tsepmin before and after the pulse. A "short" pulse is modulated by placing the corresponding LED group switch in the OFF position with a minimum of Tsepmin with respect to the previous event (LED group ON); then waiting for the "short" pulse time; and then putting the switch back in the ON position (LED group OFF). The "short" pulse is then removed from the list of "short" pulses.

5. Wait for the present "long" pulse duration to elapse and de-energize this group. Wait for the end of the pulse width of the present "long" group and put the switch of this group in the ON position (LED group OFF).

6. For all remaining "short" groups: modulate the next "short" pulse. If not all of the "short" groups fitted into the "long" group pulses (with actuation intervals of at least Tsepmin), because the "long" groups were relatively short, said "short" groups will still fit into the period following the "long" pulses. In this step, the remaining "short" pulse widths are modulated, one by one, at intervals of at least Tsepmin (see, for example, the pulses in step 4).

7. For the end of the cycle. The total cycle (for example 1 ms) may not be complete after all the "long" and "short" pulses have been completed, and this step rounds it off with a wait time.

Correct operation of the abovementioned algorithm, i.e. the "short" pulses being able to be accommodated within or outside the "long" pulses requires that $$N*(N+1)*\text{Tsepmin} \leq \text{Pulse width cycle length}$$

Figure 4A:
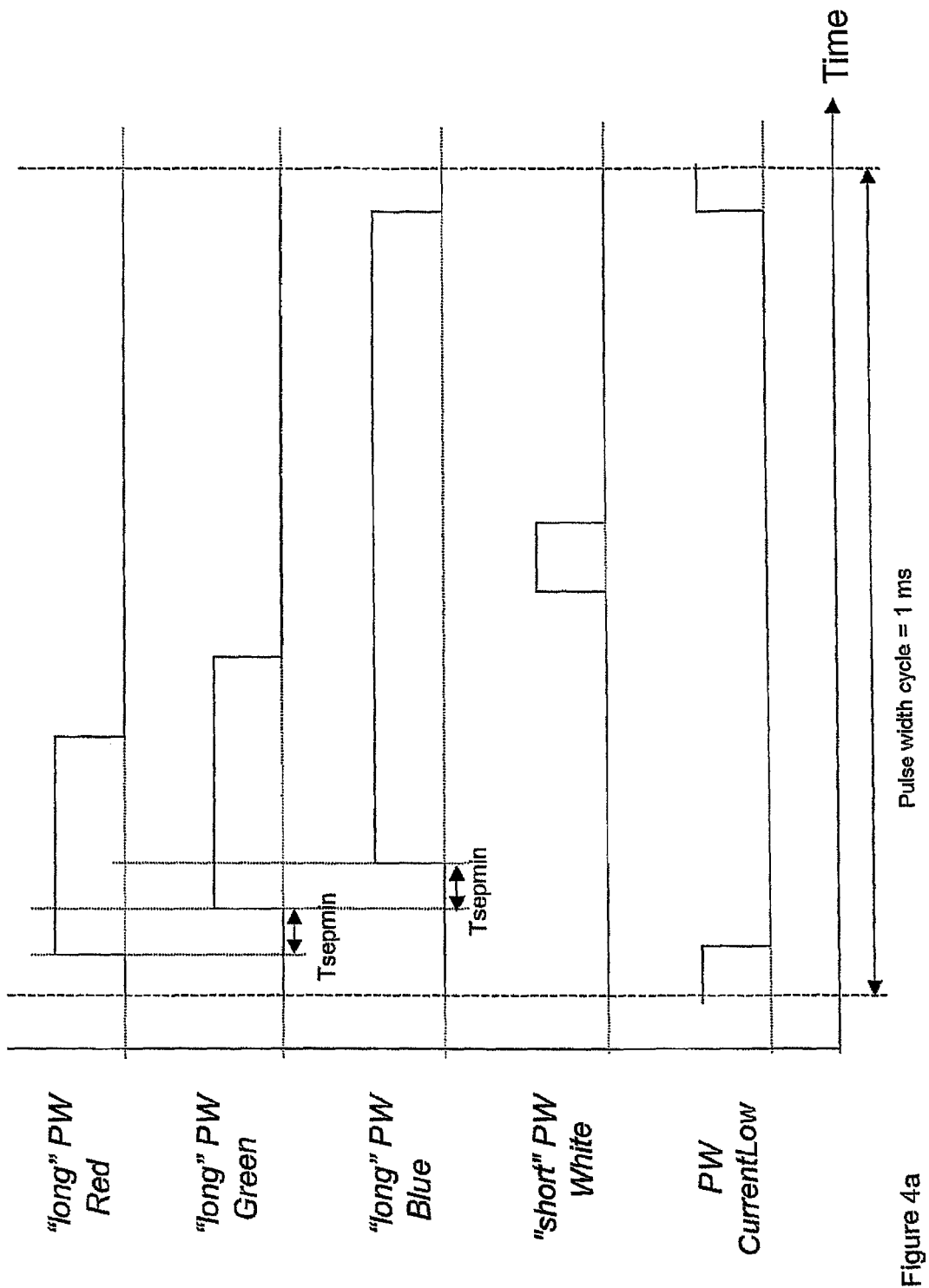
FIG. 4a shows a control schedule for operating LEDs according to an embodiment of the invention.

FIG. 4a shows an LED group drive time diagram of an exemplary drive ratio between four (N=4) groups. In this example, an LED group includes an LED with the following drive percentages: Blue 100%, Green 30%, Red 25% and White 10%. Only White is "short", as the associated period is less than four times Tsepmin at a 1 ms interval making use of the algorithm as shown in FIG. 3. The horizontal axis here shows the time, the vertical axis showing the number of pulse width (PW) signals plotted against time. In this example, Red, Green and Blue have been determined to have "long" pulse widths, and White to have "short". Two locations in the figure show an example of the Tsepmin timing. Because modulation takes place in an order from shorter to longer, Red comes first, followed by Green and then Blue, White being inserted at the first possible instant during the "long" modulation, in this case in the section where only Blue remains. The figure further shows just one pulse width cycle of 1 ms, all successive cycles being identical if modulation remains constant. For the purpose of stability and reduced dissipation, the current is switched to a low level as soon as not a single LED group is ON (see signal PW CurrentLow at the bottom of the figure).

For illustrative purposes, FIG. 4b again shows the resulting power supply output voltage and current profile (assuming ideal LEDs with a voltage of 4 volts) in the case of the drive protocol as obtaining in FIG. 4a. In FIG. 4b, the horizontal axis again represents time, the top section of the figure showing the power supply output voltage as the vertical axis. In the bottom section of the figure, the vertical axis is the current passing through the power supply, plotted against time.

Shown in two locations in the figure is the Tsepmin time interval. Over time, the top picture shows that the highest power supply voltage is modulated at the instant when all LEDs are ON. The power supply is switched down to low at those times when CurrentLow is active and all the LEDs are OFF.

Figure 5:
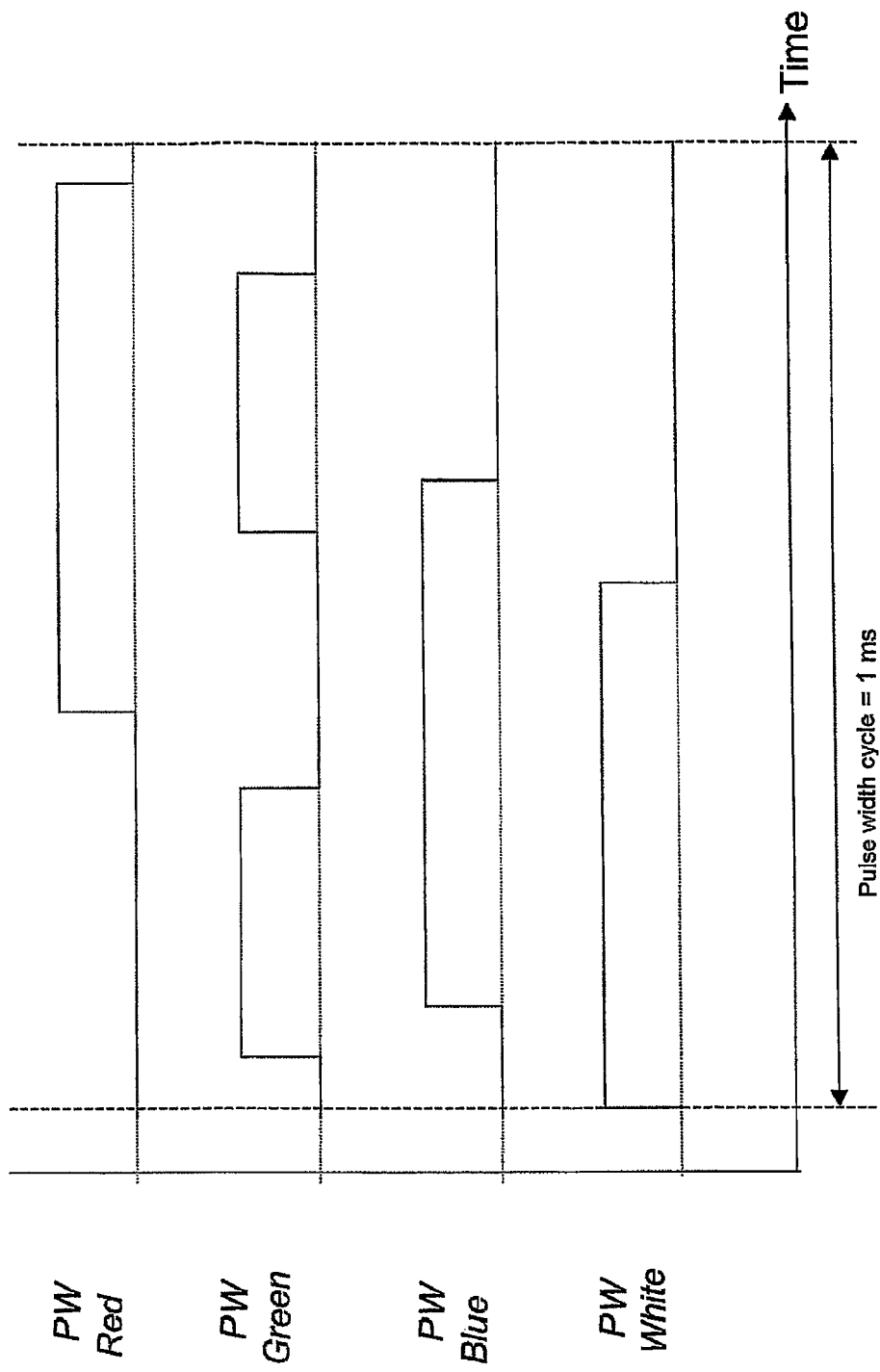
FIG. 5 shows a control schedule for operating LEDs according to an embodiment of the invention.

FIG. 5 shows an example of how at most three groups are simultaneously active and yet, on average, four LED groups are driven to a maximum capacity. The average current is 350 mA (at most, based on existing exemplary LED components), while the power supply is set to 500 mA (maximum peak current of existing exemplary LED components). In the figure, time is shown on the horizontal axis, while four pulse width drive protocols (one for each colour) are plotted over time on the vertical axis. It can be clearly seen that all four pulse widths are ON for equally long times over the cycle (the Green pulse width is subdivided into two equal halves), while at any single moment there are never more than three groups that are simultaneously ON. With two LEDs per group it is then possible, using a 24 V supply voltage, to modulate up to 8 LEDs up to maximum capacity, instead of the usual 6.

Figure 6:
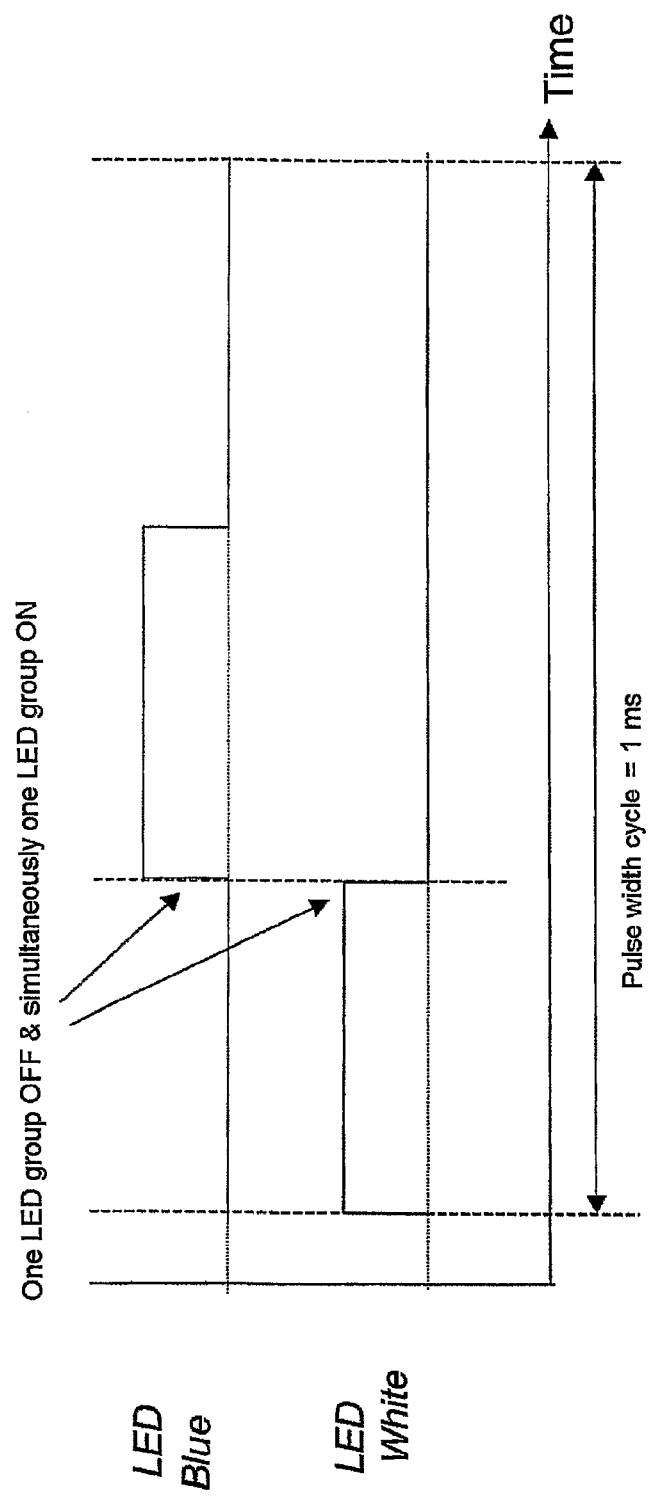
FIG. 6 shows a control schedule for operating LEDs according to an embodiment of the invention.

A further improvement of the drive principle of at least one Tsepmin between actuation events is achieved if at virtually the same instant (time difference less than the control bandwidth of the current source, i.e. the power supply, for example 0.5 μs for a 500 kHz current source) one LED group is deenergized and one LED group is energized (these being the only two events that are allowed to be combined). FIG. 6 shows an example of this principle: the time is plotted horizontally, with two LED groups in the vertical. The pulse width cycle shows how, virtually at the same instant (+/−0.5 μs) the White LED is turned OFF and the Blue LED is turned ON. As the actuation time is shorter than the regulating frequency of the current source, the combination of these events will form a smooth transition without crosstalk effects between the LED groups. By thus causing the ON and OFF event to follow one another precisely it is possible to utilize a larger fraction of the cycle time to turn a group ON. This extension to the above-described actuation principle has the advantage that each LED group can be fully modulated against additional dead time in the drive cycle if this principle were not to be used.

Figure 7:
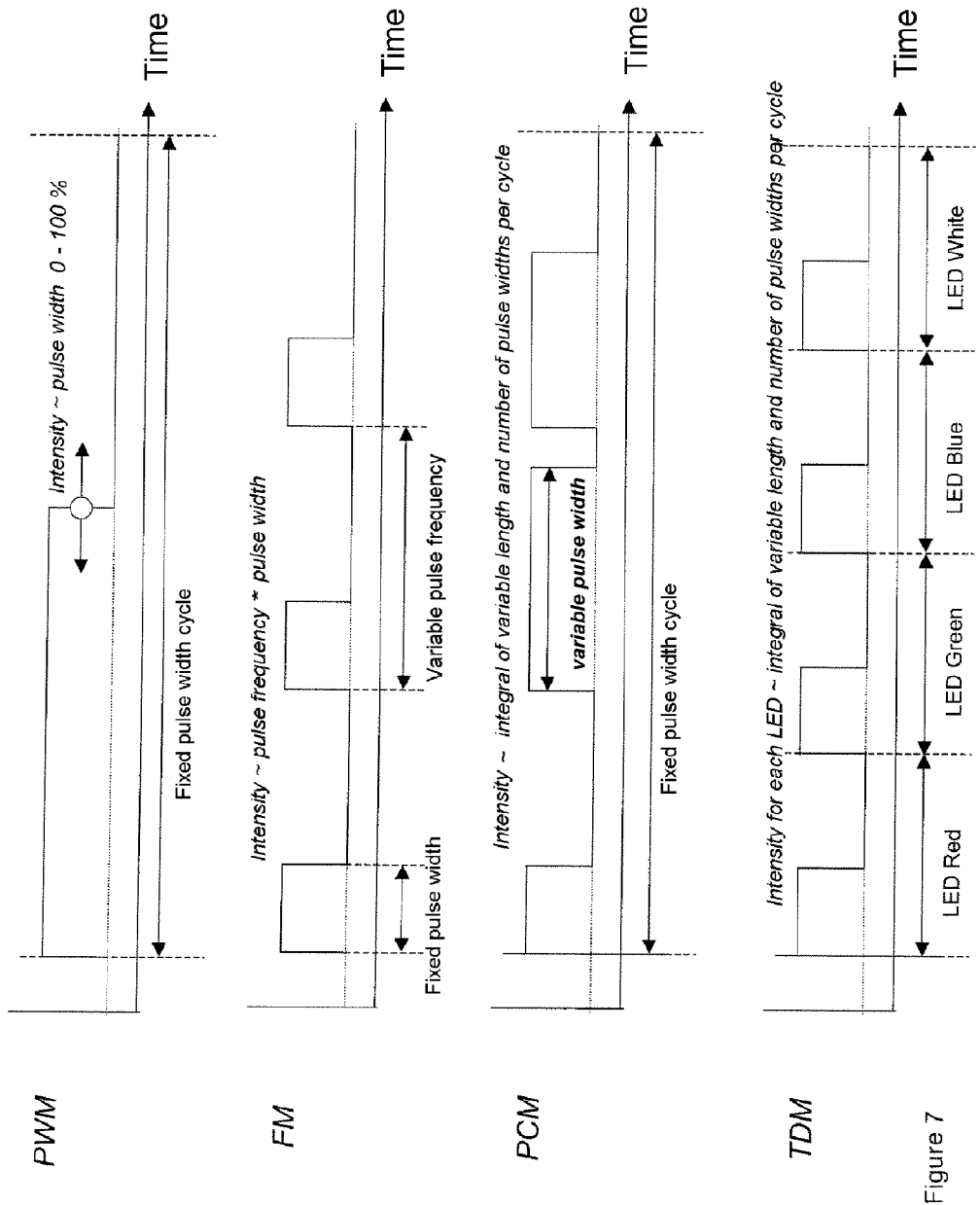
FIG. 7 shows a number of modulation techniques for use in accordance with aspects of the invention.

Use can also be made, on top of or instead of pulse width modulation, of frequency modulation (FM), pulse-coded modulation (PCM) and time division modulation (TDM). This techniques relate as follows to the LED intensity as visualized in FIG. 7 (the time is plotted horizontally, the drive principles are accommodated in the vertical direction):
  PWM: pulse width modulation. The LED intensity varies with pulse width from 0 to 100% of the pulse width cycle
  FM: frequency modulation. Fixed pulses having a variable frequency. The LED intensity varies with pulse width and frequency of the pulses
  PCM: pulse-coded modulation. Varied pulses in terms of length and position in time within a particular cycle. LED intensity varies with the total pulse area per cycle time.
  TDM: time division modulation. Each LED group is assigned its own time interval for PCM, FM or PWM.

These drive principles can, but need not, be combined in a variety of ways with the (above-described) basic principle of only actuating one switch per turn (or at one single instant one LED ON and one LED OFF), thereby giving rise to the ac vantages already mentioned: enhanced power supply stability (consequently reduced crosstalk among LED group modulation), reduced RF emission by giving rise to lower dI/dt, while at the same time the RF emission is distributed over time to a greater extent.

Figure 8:
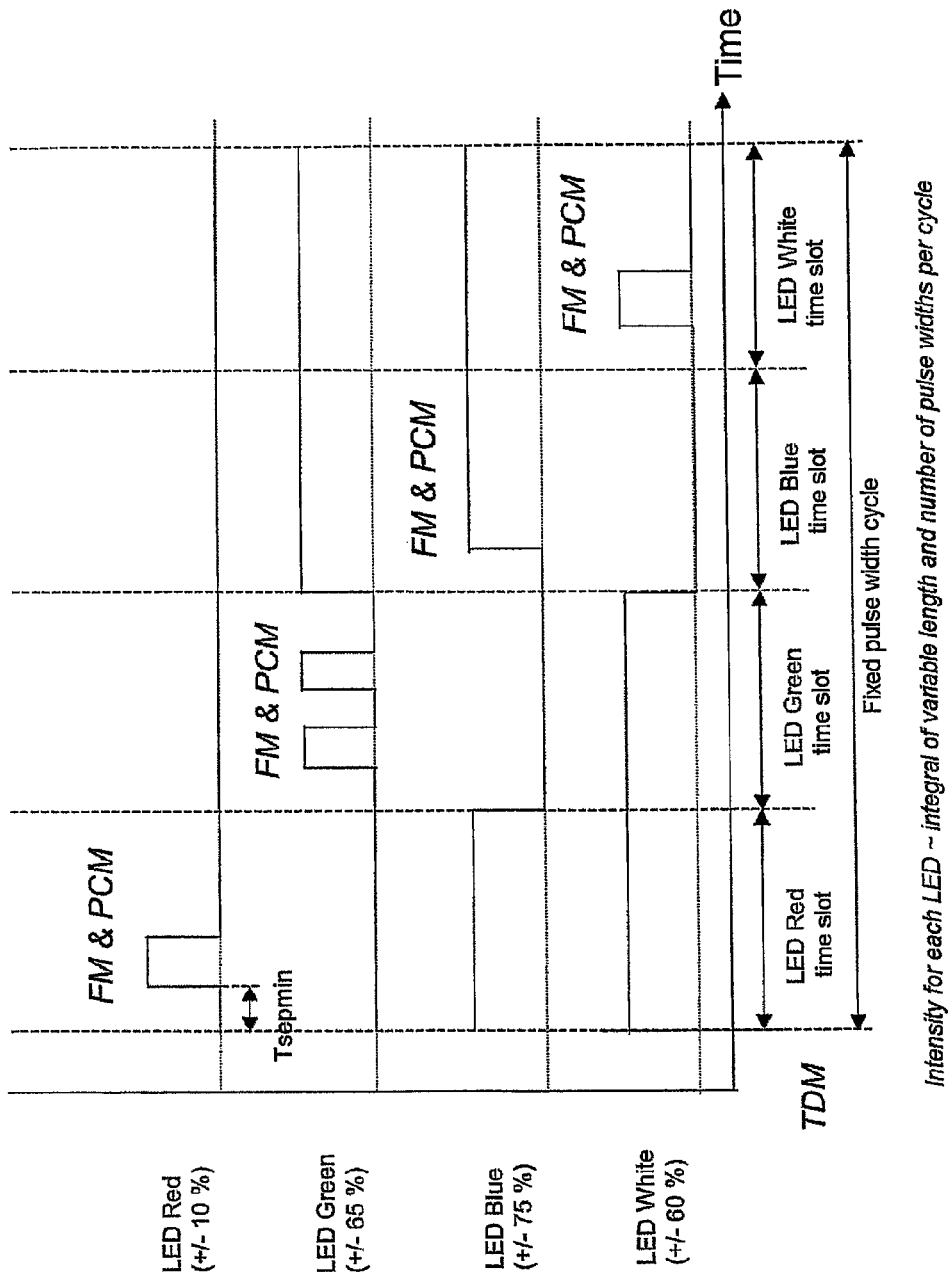
FIG. 8 shows a control schedule for operating LEDs according to an embodiment of the invention.
Figure 9:
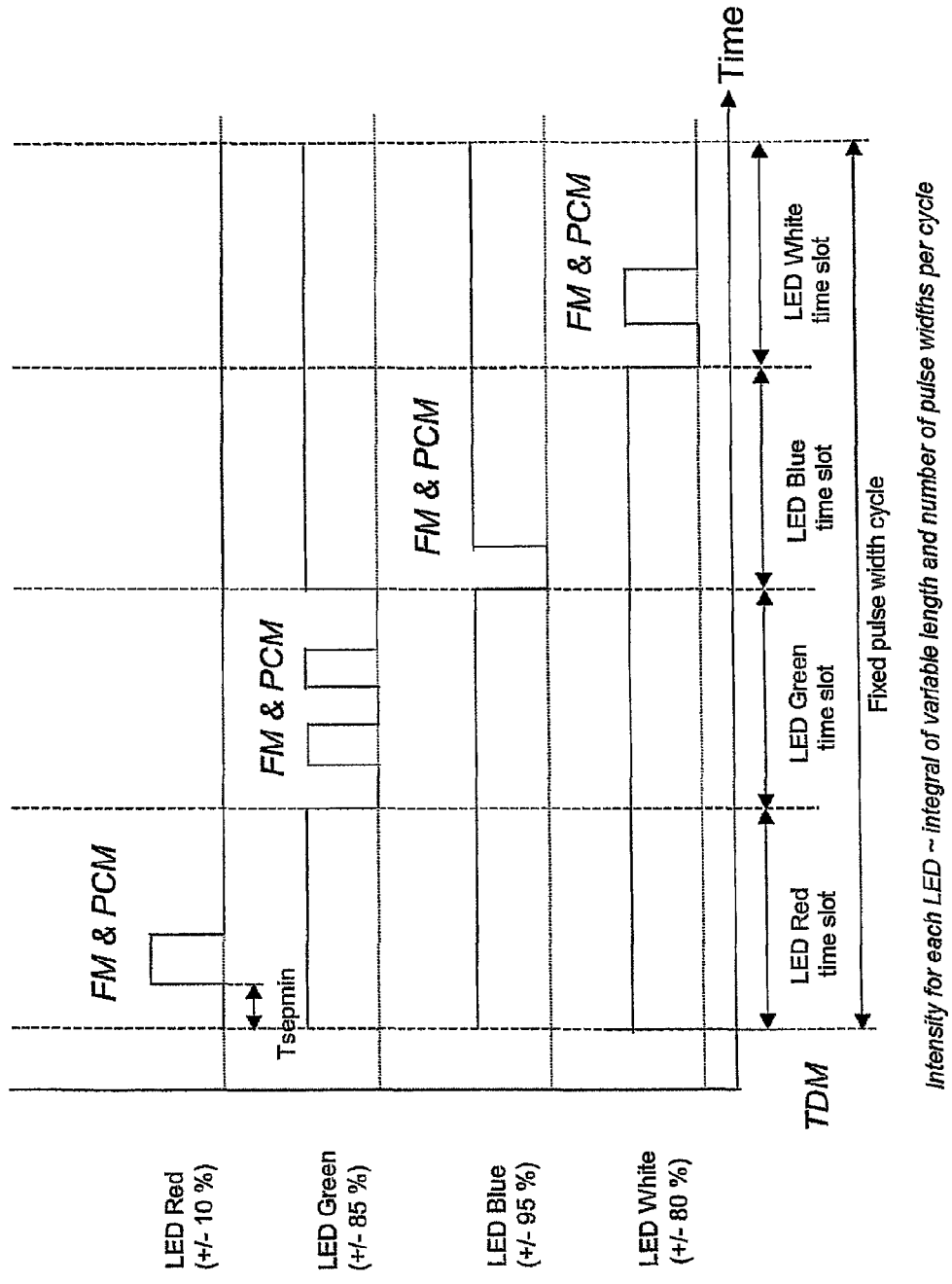
FIG. 9 shows a control schedule for operating LEDs according to an embodiment of the invention.
Figure 10:
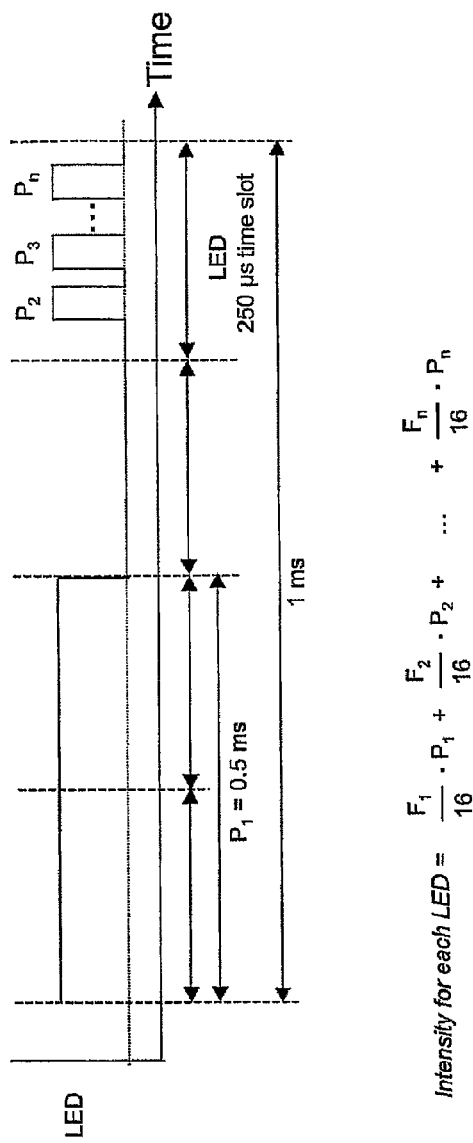
FIG. 10 shows a control schedule for operating LEDs according to an embodiment of the invention.

Based on the abovementioned drive principle, many embodiments are possible. The example shown is a possible implementation of such a drive arrangement of 8 LEDs from 24 V, which is achieved by combining TDM, FM and PCM with at most one switch action for each time interval (or simultaneously one group ON and one OFF as described with reference to FIG. 6) it is possible to feed 8 LEDs from 24 V (normally 6 LEDs) while at the same time obtaining improved crosstalk behaviour than would be achieved by means of PWM, since TDM is able to ensure a larger interval between actuation events for each LED group. An implementation involving PWM is described in FIG. 5, while FIG. 8 gives an example of a TDM/FM/PCM implementation (for which the term "algorithm-based modulation" could be used). FIG. 8, in the vertical direction, shows the possible drive protocol or a number of LED group modulation percentages, the time being plotted on the horizontal axis. The TDM aspect can be viewed as the aspect that only Red LED ON and OFF events take place in the Red time slot, with an identical approach for the other colours. The PCM aspect is manifested in the presence of one or more pulses in each time slot. The FM aspect consists in not every pulse width cycle containing one or more pulses (which pulse separately). For example, for each millisecond pulse width cycle the short Red pulse may produce a pulse only once in 16 turns (every 16 ms). Associated with the Green LED there are two short pulses and one long one, each optionally having its own pulse frequency. By varying the pulse width, numbers and frequencies it is possible for any LED drive protocol to be implemented. This example also includes the option of supplying 8 LEDs from 24 V, since only at most 3 groups are simultaneously ( ) in combination with a peak current having a factor of 1.25 on top of the average current and a maximum modulation of 75%. FIG. 9 sketches out a possibility of achieving a modulation percentage up to virtually 100% without the overcurrent principle, up to 4 groups therefore being ON simultaneously. FIG. 10 shows that any LED intensity can be achieved by means of a combination of larger and smaller pulses $P_i$, each operated with its own frequency $F_i$.

Figure 11A:
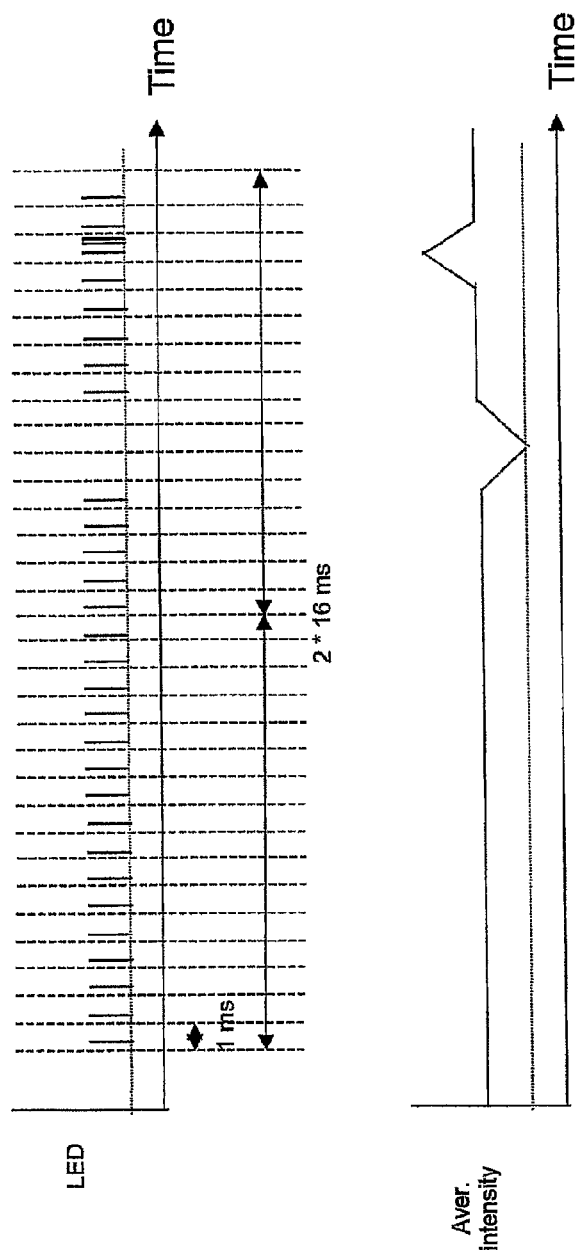
FIGS. 11a and 11b show time diagrams for driving an LED.
Figure 11B:
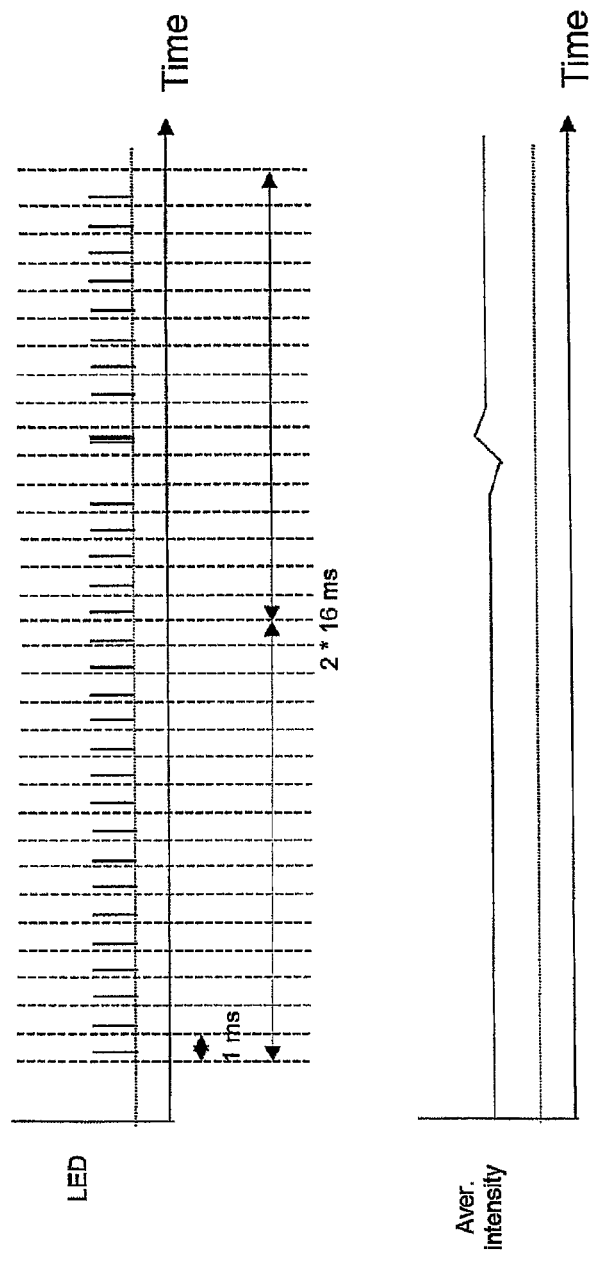

A further addition to the drive principles described in the present document, which are described with reference to the preceding figures, is to compensate for the sensitivity of the human eye to short-term changes in intensity. Partitioning the pulses more uniformly, in terms of intensity integral over time, across the frequency modulation interval (for example a cycle of 16 ms) avoids any ripple from becoming visible at intensity transitions, the modulation principle involving the replacement of a plurality of small pulses by one large one. By way of example, FIG. 11*a* shows a small intensity transition, where three short pulses are replaced by one long one, uniformity not being ensured in the process. This figure shows the time horizontally and, from top to bottom, first of all the two intensities and the a the intensity averaged over 16 ms per ms. In FIG. 11*b*, the pulses are distributed in such a way over the 16 ms time interval, that the eye no longer detects the transition. Here the time is plotted horizontally, together with, from top to bottom, again the two intensities with a better pulse distribution, followed by the average intensity over 16 ms per ms.

Yet a further addition to the drive principles described in the present document is the option of employing a photosensor and using the sensor information to adapt to ambient light or for maintaining the lamp intensity at the stable level irrespective of other variations such as temperature (as this affects the light yield of an LED).

It should be noted that the use of the invention is not limited to illumination purposes, the method and apparatuses described herein, comprising, for example, the high-speed power supply, indeed also being suitable, using one or more LED groups as a transmitter, for transmitting an optical modulated communications signal which in turn can be received, for example by an optical sensor. This information can be handled both with visible light or alternatively in the infrared or ultraviolet, using corresponding infrared or ultraviolet LEDs.

In the abovementioned examples it is possible to have a switching current source (power supply) running synchronously, in control terms, with the LED actuation instants. This principle ensures that low intensities (short and low-frequency pulses) are driven more stably, thus allowing an improvement in resolution.

The groups of LEDs can be driven by one or more communications interfaces, many options existing for the communications interface of an LED fitting. Wide use is made of the so-called DMX protocol, other options being: power line communication (data transmission superimposed on the supply voltage, usually making use of a frequency or amplitude modulation method), or by means of a radio-frequency interface.

A further addition to the drive principle is the option of defining the intensity of the LED logarithmically with respect to the modulation level received via the communications interface. The human eye is more sensitive to relative than to absolute intensities. This means that a difference of between 100 and 110 lumen is visible in a similar manner as between 1000 and 1100. This difference can be employed to achieve, by means of logarithmic conversion, a smooth transition from minimum modulation to maximum modulation, using fewer bits that need to be communicated via the communications network. This aspect can be employed, for example, in order to double the number of channels in a DMX network (for example from 16 bits to 8 bits per LED colour) while still achieving apparently similar quality.

Figure 1:
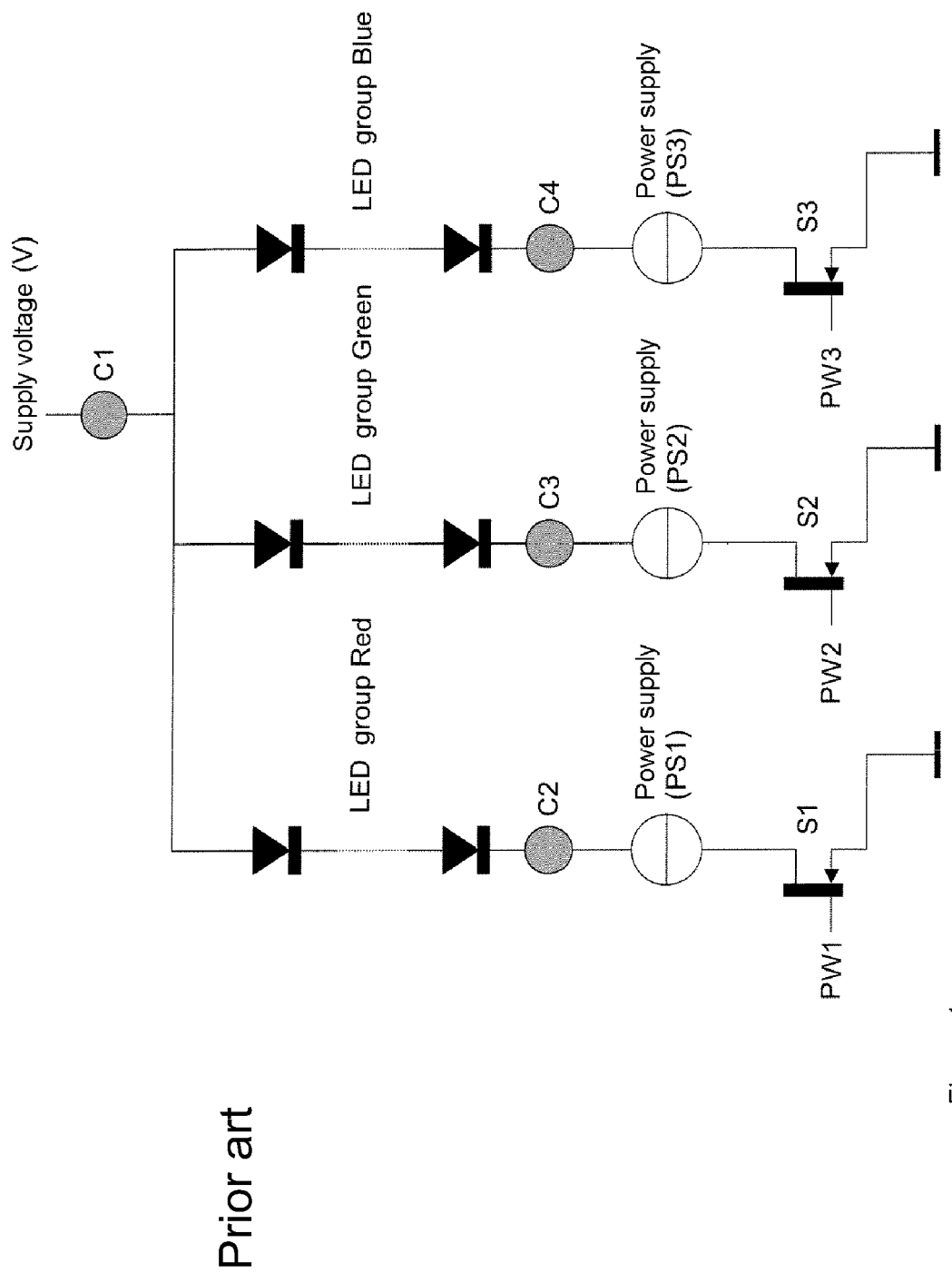
FIG. 1 shows a schematic depiction of a circuit for operating groups of LEDs according to the prior art.
Figure 12A:
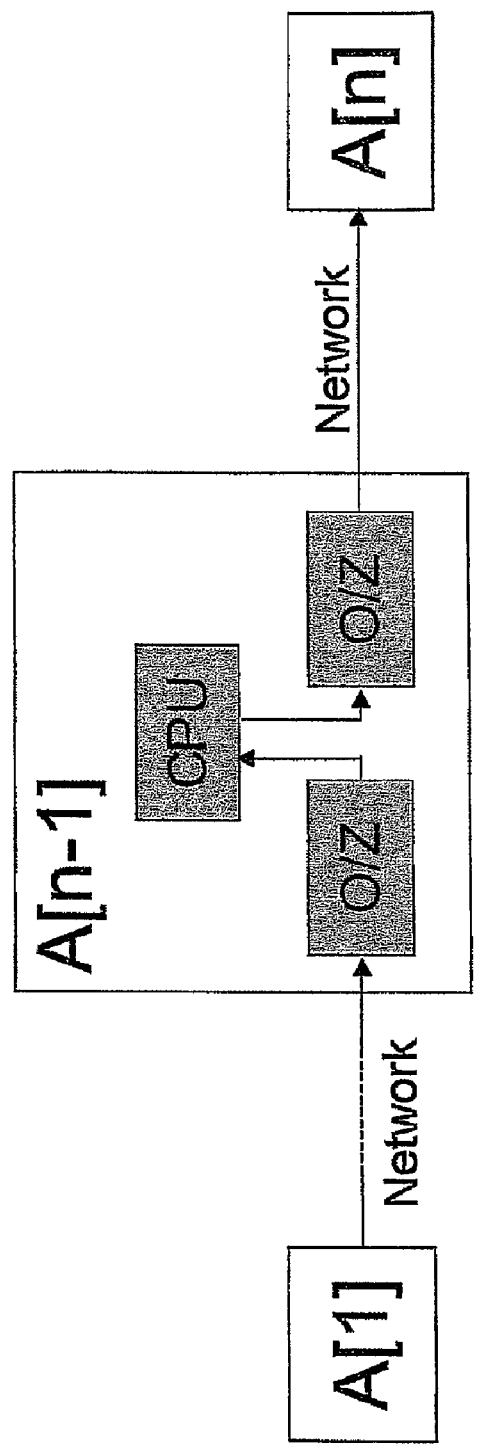
FIGS. 12a-d illustrate a further aspect of the invention.
Figure 12B:
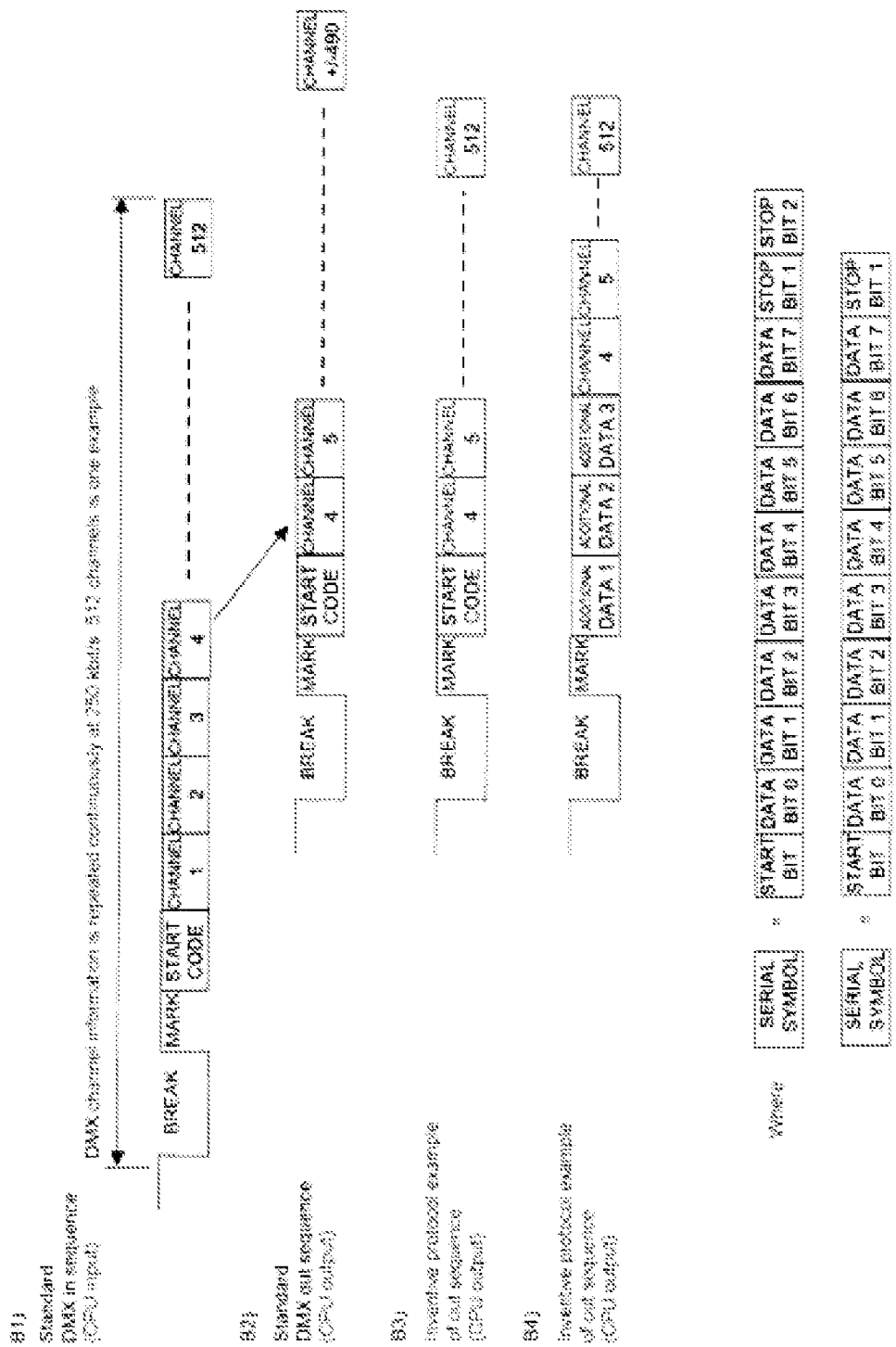
Figure 12C:
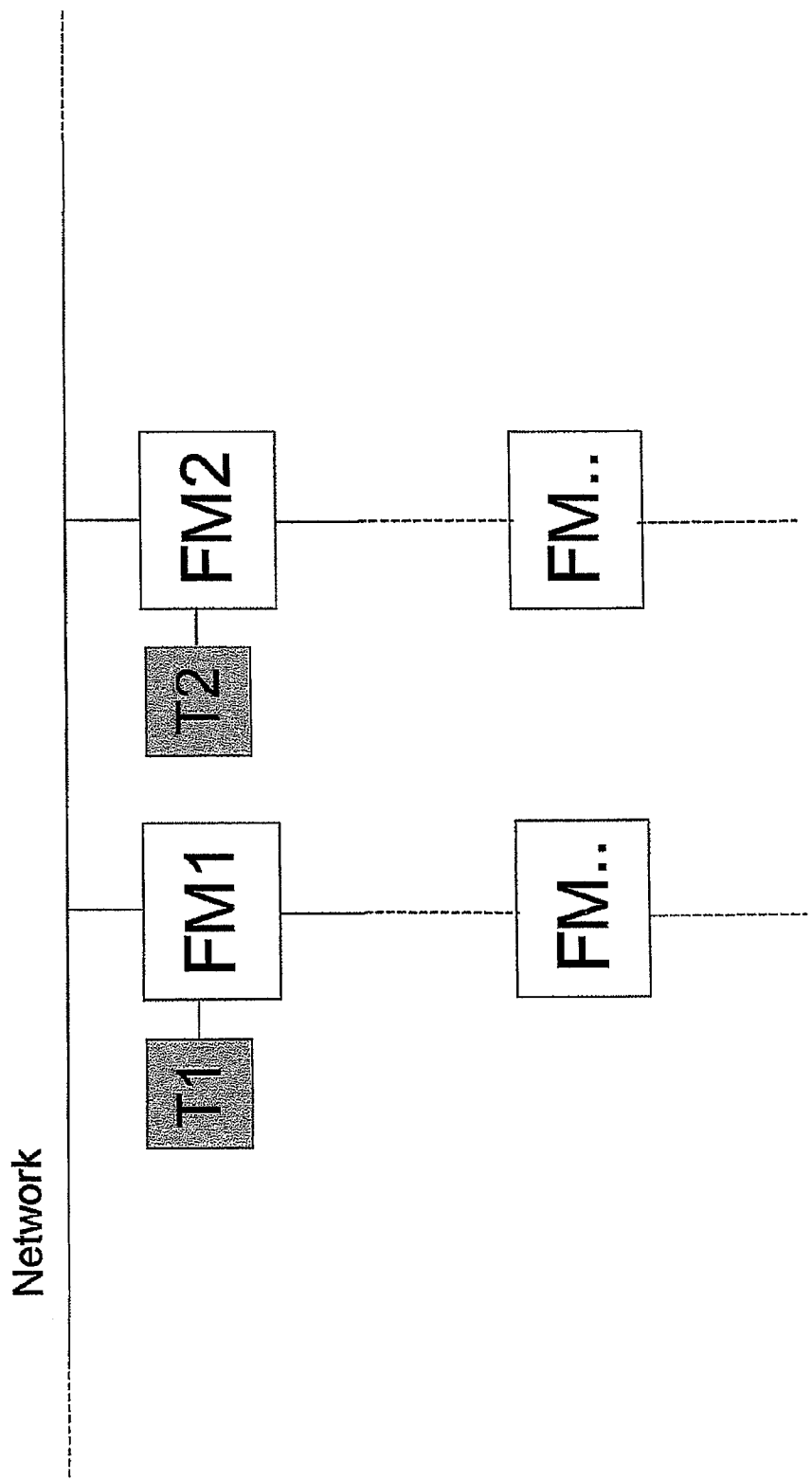
Figure 12D:
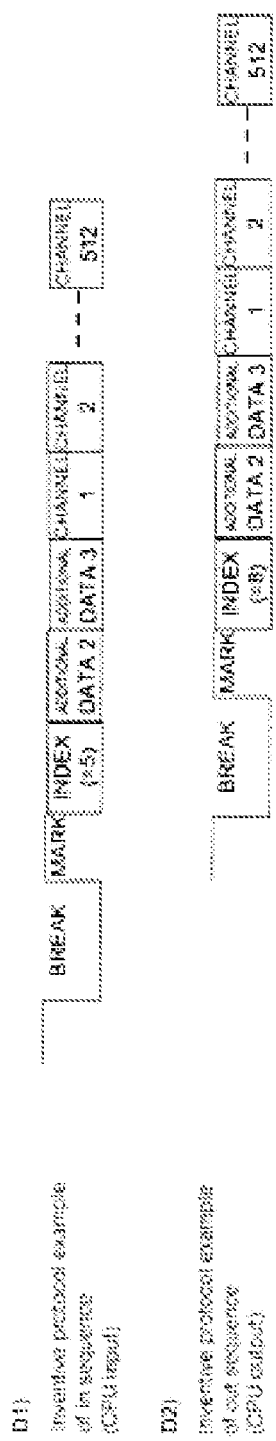

A further aspect of the invention will be explained with reference to FIG. 12. In present-day lighting installations, DMX is often used as a network standard. DXM is based on differential digital communication using a two-wire cable. Each DMX node (light fitting) taps off said two-wire bus. In such an arrangement, each LED fitting makes use, for example, of 9 switches to set a 9-bit address which is used to specify which byte of a 512 byte data stream the current channel information for an LED group starts from (the so-called start address). This configuration technique making use of switches means that during installation all the switches of each fitting can only be correctly set by hand, this process necessarily being repeated if a unit is replaced in the event of a fault. Because of the two-wire bus principle, each node constitutes an impedance load for the DMX master output, and this is usually maximized to 32 nodes before a so-called DMX buffer has to be employed. For many applications, the limit of 32 is reached quite rapidly. Moreover, for distances greater than, in this example 30 m, it is necessary for the bus to be terminated, for signal reflection reasons, with a characteristic impedance, 30 m being a distance for the total network which likewise is rapidly reached in many applications. In practice, the termination is often forgotten or is not properly installed, quickly giving rise to problems. Another aspect that could give rise to reflection, are so-called T branches, which are therefore not permitted from this perspective. Moreover, the DMX two-wire bus, in terms of signal integrity over extended distances, requires high-quality, more expensive cabling. The objective of the continuous-loop principle ("daisy chain") is to overcome (some of) the above-mentioned drawbacks for DMX, but possibly also to add similar protocols and, at the same time, a number of new options, see FIG. 12a. FIG. 12a shows a starring point fitting (A[1]), followed by a continuous loop up to and including fitting A[n]. A[n-1] shows that each fitting includes a CPU to drive the LEDs (PWM or the algorithm-based modulation principles already mentioned hereinabove) and a network interface having two network connections or two transceivers for communication towards A[n-2] and A[n], respectively. In the case of, for example, DMX, the CPU is provided with all the channel information of the fitting upstream thereof. The CPU of a fitting will then trim ("consume") this information from the start by the number of channels required to drive the local LED groups and will then pass the remainder on to the next fitting. See FIG. 12b1 for incoming data and 12b2 for outgoing data of an example involving the "consumption" of 3 channels. By channels being "consumed" for each fitting, the channel information is automatically distributed as required to channels of each individual fitting. A White LED fitting only takes off 1 channel, for example, and an RGB fitting takes off 3 channels. This consumption principle has the advantage that configuration is no longer necessary for a start address, resulting in lower component costs but also in less effort during installation. Because each fitting reads the channel information and stores it in a memory before passing it on, DMX buffers are not required, since each link has only two nodes. The terminating resistors have become virtually superfluous, since in a normal situation the distances between the fittings rarely exceed 30 m, a distance which is permitted between any two connected fittings. Moreover, a type of T branch is also possible, a fitting acting as a local master. The signal integrity is fully restored in each fitting, allowing more cost-effective cable specifications. As the incoming data stream rate is generated by a bit clock separate from that of the outgoing stream, a variation of two times 2% could in principle exist as the difference between incoming and outgoing bit rate for DMX (based on the RS485 standard). This means that if no additional measures are taken, some 490 channels can be transmitted in the worst case, since more data come in within a unit of time than can be transmitted (the transmitter then has a +2% rate and the receiver a −2% transmission rate: 96% of 512=490). The loss of 512−490=22 channels can be counteracted by dropping one stop bit, of the two employed by the DM) standard, for the outgoing bus protocol. Consequently, some 9% (1/11) fewer data need to be transmitted at the output than come in at the input, more than cancelling the 4% difference owing to clock variation, see FIG. 12b3. Given that in fact some free capacity has been produced as a result of dropping the additional stop bit, it is possible to append additional control data, see FIG. 12b4. The continuous-loop principle can furthermore be readily combined with the normal bus-based wiring, giving rise to a kind of "local masters", see FIG. 12c. The options for transmitting additional data from a fitting to the next one in the circuit allow matters such as 50/60 Hz synchronization (to avoid flicker effects owing to small differences in frequency between, for example, video cameras and the LED actuation instants) to be controlled centrally by the master which appends the zero passage information as phase status information to the data stream towards the next fitting. In a fitting, the LED modulation will then be synchronized by slightly retarding or accelerating the clock until a "lock" is achieved between the 50/60 Hz frequency and the modulation phase. Another interesting information transmission is the temperature of LEDs or ambiance: FIG. 12c shows that fitting FM1 and FM2 are masters which, for "their" continuous-loop network generate the settings for the LEDS daisy-chained to each FM. Also shown are the temperature sensors T1 and T2 which can use a master to achieve the maximum setting of light (often thermally limited) at a particular ambient temperature: this has the further consequence that for the fittings coupled to the master there is less need for individual derating from the thermal limit of each. This has the advantage that there is less risk of differences in brightness, and the thermal sensor can possibly be linked on its own to the first fitting. Another possible advantage that local masters may offer is this: if, for example, the fittings linked thereto are all requires to have an identical output signal, the number of DMX channels required can be reduced, the local masters then ensuring the distribution of colour data to the daisy-chained fittings.

The above described aspect of the invention can be articulated as a lighting unit comprising one or more LEDs, a supply unit for feeding the LEDs and a network interface, characterized in that the network interface is provided with a first network connection for communicating with an upstream lighting unit in the network and a second network connection for communicating with a downstream lighting unit in the network.

As an alternative to the "consumption" of the relevant data, an index value of the input DMX bus can be transmitted as "index+number of channels to be used locally" to the output bus. This allows each DMX node to determine which DMX channels are relevant for the self same node (the index value points at the current channel address), see FIGS. 12d1 and 12d2, the incoming index of 5 (FIG. 12d1) indicating that the (e.g.) 3-channel fitting in question uses channels 5, 6 and 7. For the output data stream, the fitting adds 3 (number of channels used by the fitting) to the incoming data stream 5: 8 is transmitted to the next strip (see FIG. 12d2).

Figure 13B:
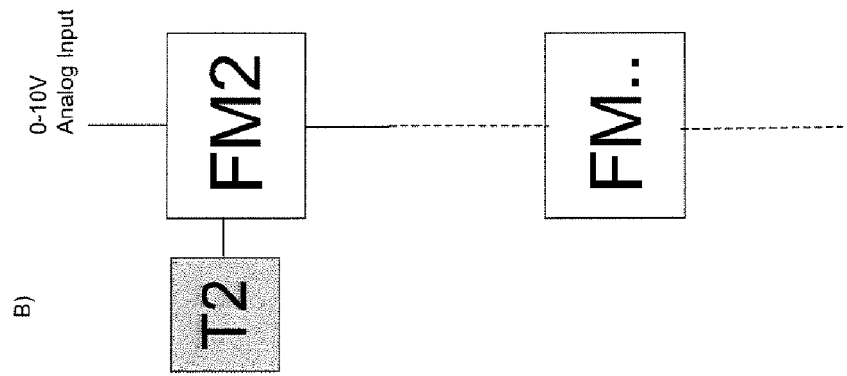
FIGS. 13a and b show a block diagram of yet another aspect of the invention.
Figure 13A:
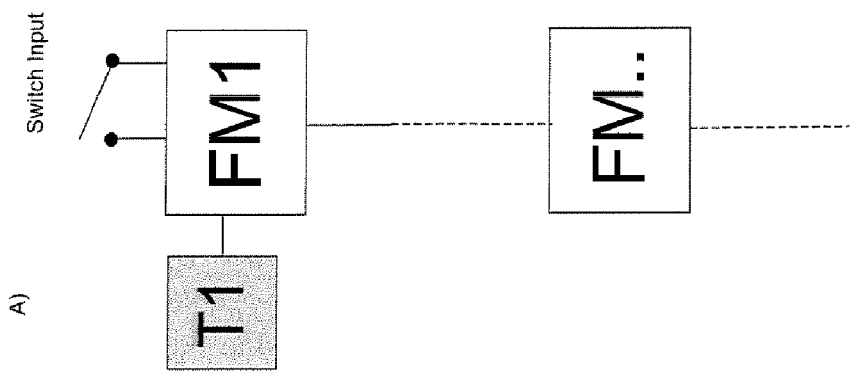

The daisy-chain can also be combined with a simple operational interface (even down to a single switch or analogue input) and a DMX controller which is integrated in the CPU and is operated via said operational interface, resulting in a cost-effective and robust solution for simple, e.g. white-light, applications in which a switch starts and stops a dimming lightshow, see FIG. 13a. In this figure the switch, for example, serves as a selector between one scene or another, depending on the position of the switch, or the switch can serve as a push-button to start or stop a scene. Distribution of an analogue intensity signal is customary, but often entails stability and variation problems as a result of shielding and earthing issues. Inputting an analogue signal at just one point and transmitting it digitally allows the distribution stability to be improved, see FIG. 13b. The analogue signal in this figure is passed on digitally as DMX channel values. Another example is an RGB fitting having a built-in DMX controller in conjunction with a lightshow which varies through the RGB colour space and a simple user interface which allows a colour to be chosen by starting and stopping the DMX controller by means of the switch. Yet another application is to allow a sensor or switch to select or influence a lightshow, possibly using sensor information received from other network nodes.

The operational principle as explained with reference to FIG. 13 (integrated DMX controller and lightshow operation) can of course also be used without the continuous-loop principle, i.e. in a normal DMX or some other protocol situation, retaining the abovementioned advantages.

When daisy-chaining as described with reference to FIGS. 12 and 13, use can be made of an ambient or LED temperature sensor whose current value forms a negative correction factor (stronger dimming at higher temperature) for the DMX output signal, thus achieving central dimming in order to ensure that in the event of temperature limits being exceeded the various fittings will not emit their own maximum light levels, as these have thermally different limits owing to ambient factors. Said central dimming can then be combined with local dimming as a further protective measure, or the central dimming can render local protective measures unnecessary.

Figures 14A, 14B:
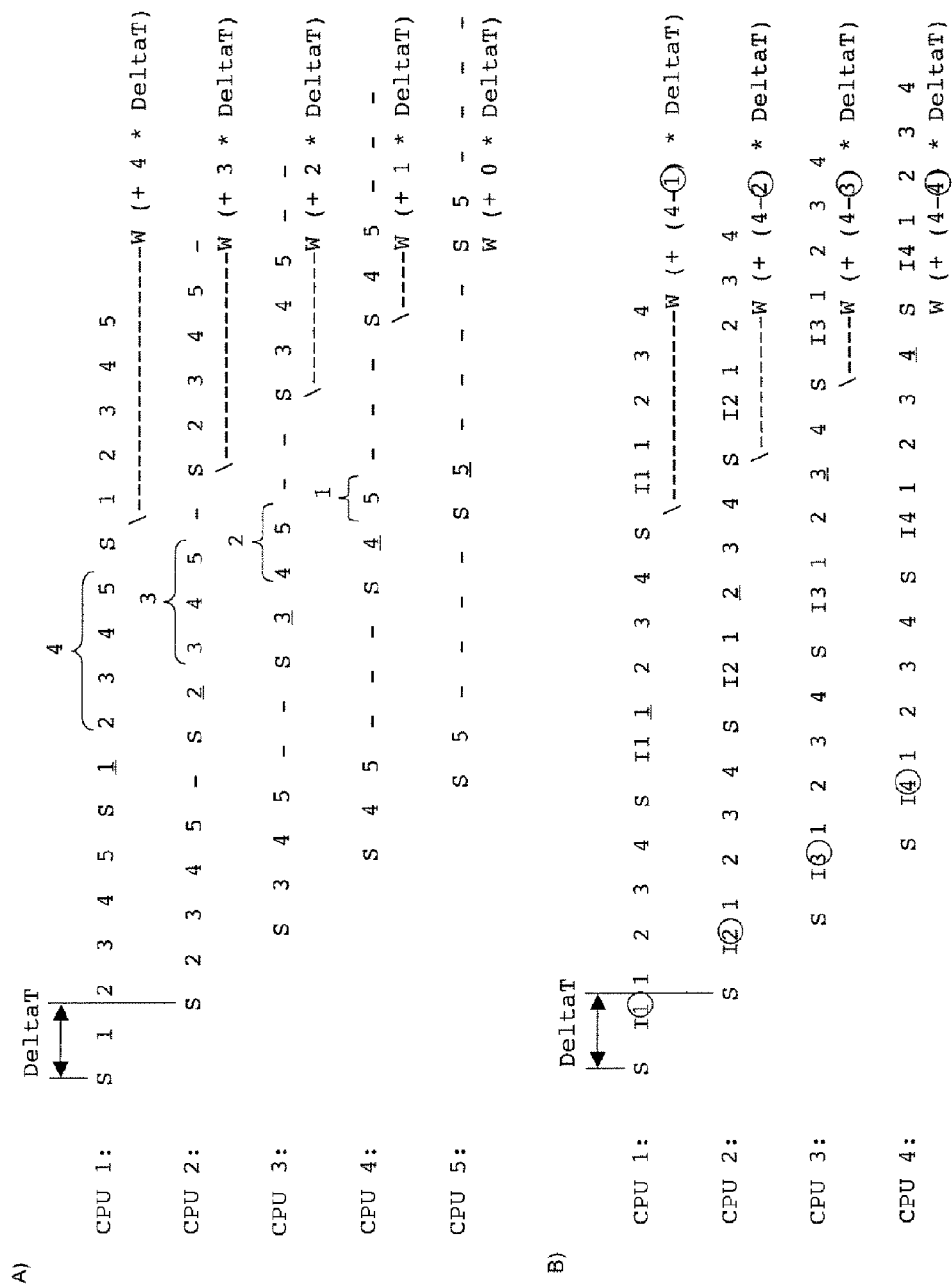
FIGS. 14a and b show time diagrams of data streams according to an aspect of the invention.

It is also possible to add a mechanism to implement timing compensation for the processing time losses relating to reading into the CPU and transmitting the channel data to the next fitting. This compensation then makes it possible for all the LEDs of all the fittings to be actuated simultaneously, relevant in the case of many daisy-chained fittings and a coordinated lightshow. FIG. 14a shows an example of time compensation in the case of the "consumption" principle of the channel data in a fitting. For each fitting this involves waiting, before channel data received for the fitting in question are used, for the next start symbol plus the number of channel data received *DeltaT, where DeltaT is a measure for the delay caused by each fitting, and the number of received channel data at a specific fitting as a measure for the correction factor required, so that all the LEDs are actuated at the same instant W. FIG. 14b shows an example of time compensation in the case where the indexing principle of 2 is employed, one and the same or an additional index (in the figure provided with a circle) provides a measure of how long the wait is required for each fitting in order for the LEDs again to be able to be actuated at the same instant W.

Figures 15A, 15B, 15C, 15D, 15E, 15F:
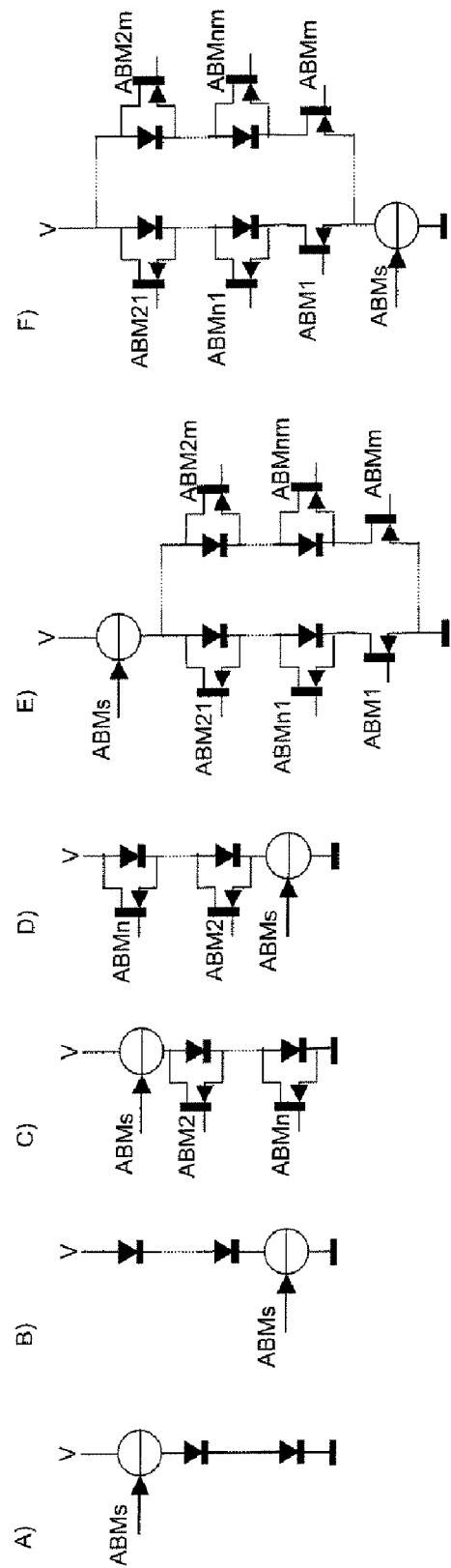
FIGS. 15a-f show actuation diagrams according to aspects of the invention.

The abovementioned and other advantages of algorithm-based modulation (ABM) (as described with reference to, for example, FIGS. 4 to 9 inclusive) can be achieved not only in a plurality of LED colours using a single power supply, but also (in part) in combination with other power supply, LED and/or switch configurations, as shown in FIG. 15a-f for a number of examples. 15a depicts a configuration where the power supply is connected to the supply voltage and is switched on and off by means of ABMs having the advantages as stated previously. A system could consist of a plurality of 15a circuits in a design where, for example, the TDM aspect of algorithm-based modulation ensures that peak currents are lower as a result of not all the power supplies always being actuated simultaneously and also possibly, not all being ON simultaneously. FIG. 15b gives an example with a power supply connected to earth, a single system optionally also consisting of a number of 15b circuits. Again, 15b provides the advantages of TDM. FIGS. 15c and 15d show circuits with the possible option of using both the power supply controls and/or the switches via the LEDs. FIGS. 15e and 15f depict configurations in which a single power supply in the form of a connection in parallel can feed a number of circuits by means of the switches ABM1 to ABMm inclusive. By virtue of the connection in parallel, a single, more powerful power supply is able to illuminate the LEDs by means of time distribution over the various parallel circuits. This has the advantages, inter alia, that fewer power supplies are required and that even with a single power supply there are effective options, in a white-light fitting, for mixing warm and cold white light (by using various white LEDs differing in colour warmth in two parallel circuits) to produce a specific colour temperature. A specific embodiment of this aspect of the invention can be formulated as a method of operating, using one or more power supplies, a number of high-power light-emitting diodes (LEDs), said number of LEDs being distributed over two or more groups, each group being separately energizable, characterized by a previously energized group being deenergized simultaneously with a subsequent one of the groups being energized.

The current feedback measuring sensor used can be a resistor connected to earth while the power supply is connected to the supply voltage, or a measuring sensor on the supply while the power supply is connected to earth.

Alternatively, the current feedback measuring sensor can be a resistor at a desired location between the LED connections, to indicate the current through the LEDs.

In larger installations, the peak currents of the LEDs even if counteracted by algorithm-based modulation as previously described, give rise to considerable problems and costs. An additional aspect of the invention is to use the data network, for example DMX, as a time synchronization medium, where the various LED fittings impose a small time jitter, different for each fitting, to the LED drive protocols. Differing jitter can be achieved, for example, by means of a binary pseudo-random generator. This approach reduces total emission, and the peak current problems are more readily addressed. This can be formulated as a method of operating, using one or more power supplies, a number of high-power light-emitting diodes (LEDs), said number of LEDs being distributed over two or more groups, each group being separately energizable, characterized by a time jitter being applied at the instant when one or more of the groups is energized or de-energized.

Figure 16:
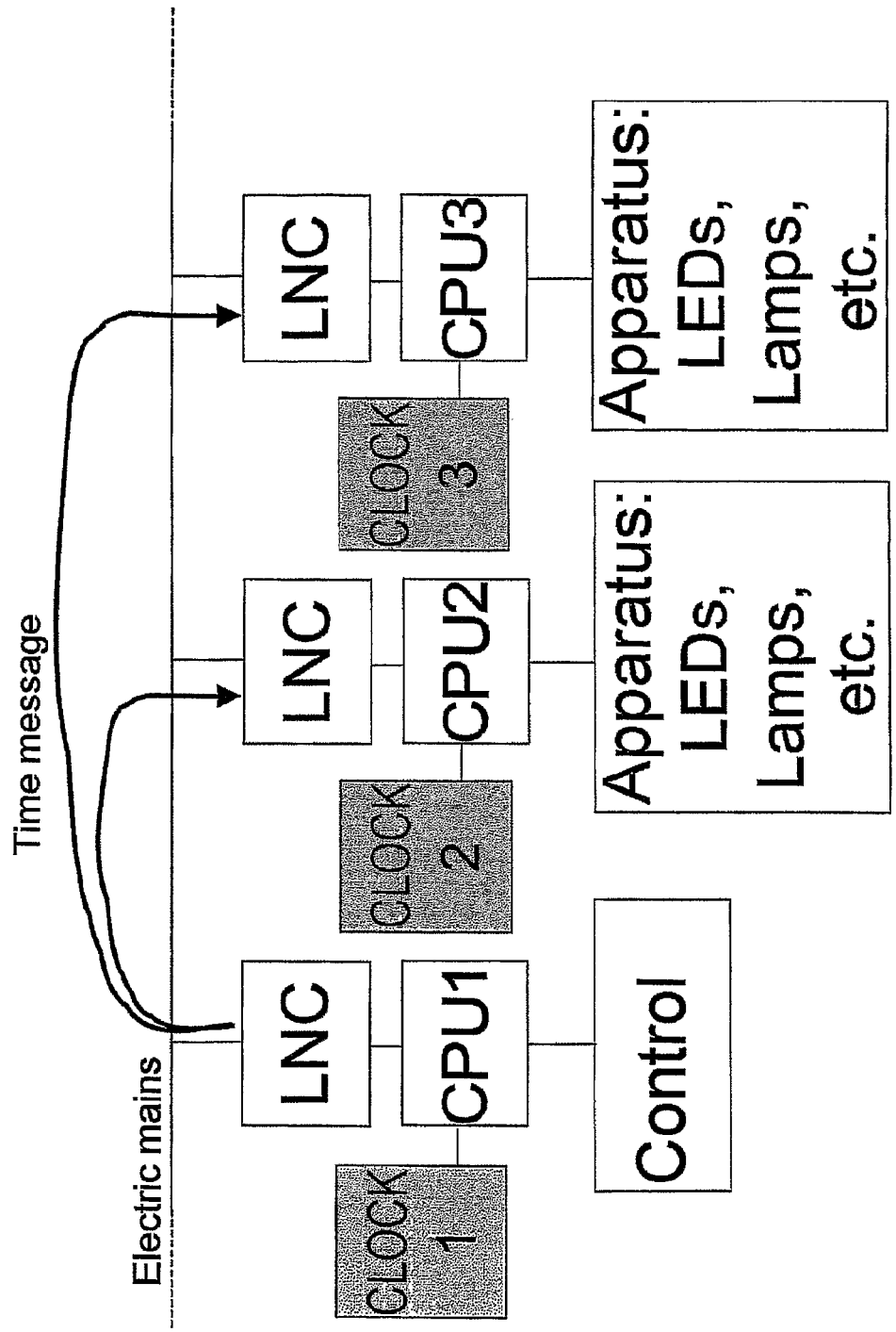
FIGS. 16 and 17 show block diagrams of aspects of yet other lighting systems according to the invention.

In many lighting applications it makes sense to take into account the existing 110/230 V infrastructure. In so doing, the use of additional cabling for data communication represents an additional cost item and sometimes cannot be achieved elegantly or neatly. With respect to meter cabinet readings there are cost-effective solutions to read these remotely by means of radio-frequency communication via the electric mains, but these often have limited bandwidth. There are also options for communicating at higher speeds (developed, for example, for domestic Internet communications), but these solutions are involved, expensive and consume a great deal of electricity in operation. The direct use of, for example, DMX communication is therefore generally not cost-effective, given the high bandwidth required for this protocol and the lack in robustness of network communications via the electric mains. Moreover, average use does absolutely not require the continuous exchange of a low of data, for example for atmospheric interior lighting. One idea is to provide a cost-effective, compact and power-efficient solution to this problem by using a lower communications bandwidth in conjunction with a show generator (master) executed by the central processing unit in each light fitting which achieve time synchronization of the show via the network, see FIG. 16. Time synchronization can be achieved by transmitting a time telegram from a point (CPU1). This is because correct reception at each fitting results in virtually simultaneous reception within a bit time of the bus communication, the synchronization accuracy at 2400 bits/sec in that case therefore being well below 1 ms, invisible to the human eye. The CPU2 and CPU3 in this example then each perform the same lightshow (each their own part), in which it does not matter if the communication fails from time to time, as long as the failure does not persist sufficiently long for the fittings' clocks to start to diverge significantly from one another. Thus it is possible to perform highly dynamic and complex lightshows without suffering the consequences of a specific error percentage in the data communication. The idea described here can be formulated as a lighting system comprising a plurality of lighting units which are each provided with one or more LEDs and a central processing unit for driving the LEDs, wherein the central processing units are each provided with a memory for storing instructions for energizing and de-energizing the LEDs of the lighting unit in question, and wherein the lighting system comprises a communications network for transmitting, during operation, synchronization messages to one or more of the processing units, for the purpose of temporal matching of an energization and de-energization scenario of the LEDs of the lighting units.

It is also possible to run the communication via a lower-voltage bus downstream of a transformer or some other radio-frequency barrier thus keeping communication between fittings on a local level.

Another option is to transmit the programme to be performed (show) from the central master to all the nodes, therefore allowing a new lightshow to be selected.

Figure 17:
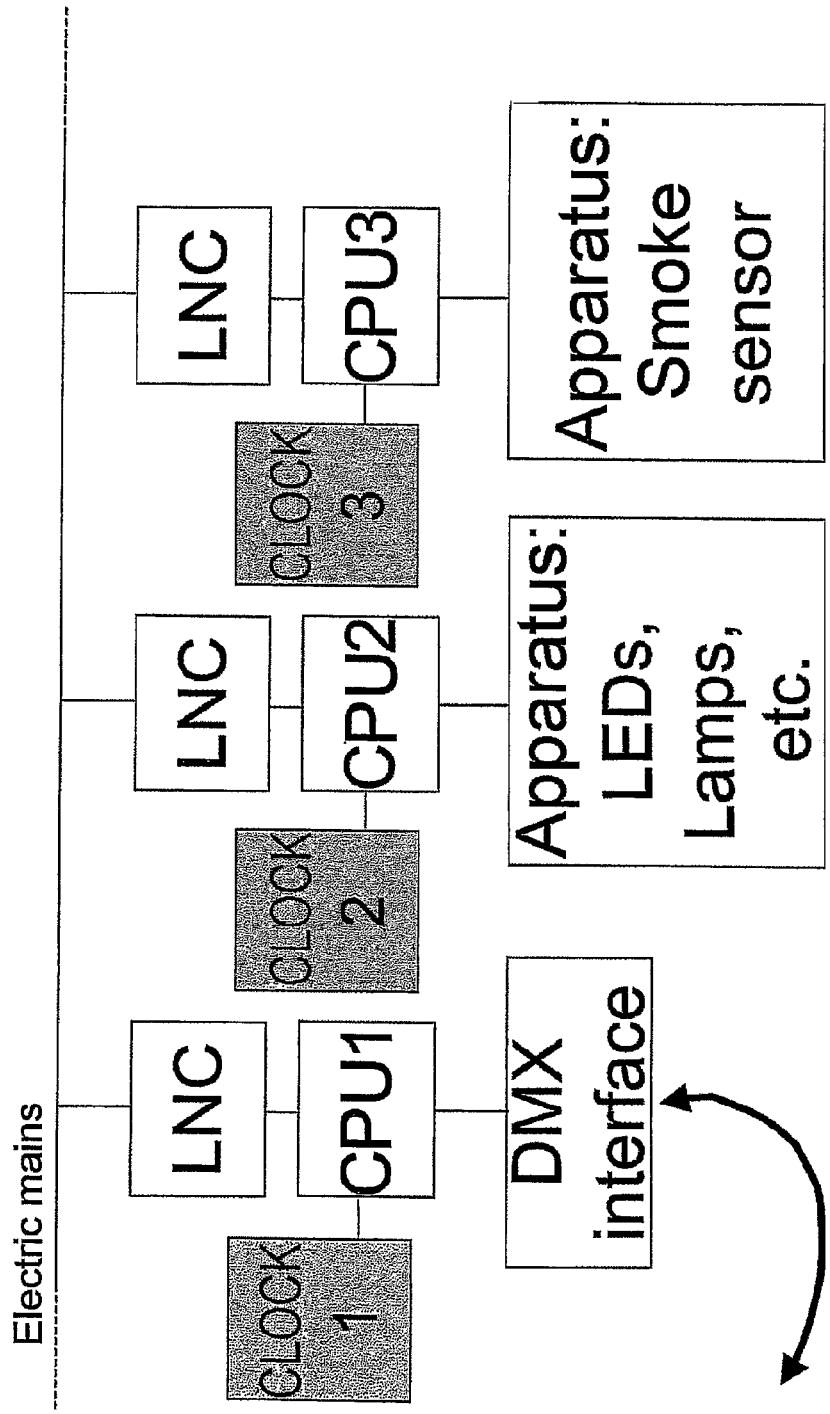

A further option is to provide "bridges", for example to wireless control elements or DMX networks, as LED setting information for the fittings or for reading sensor elements (temperature, smoke sensor and the like), see FIG. 17 for a DMX interface linked to CPU1, where CPU1 then serves as a "bridge" between the DMX channels and the settings for CPU1 and CPU2 in this example.

The most cost-effective light fittings will not be provided with control elements. Often, a fitting does require many settings such as current trimming facilities, show to be performed, DMX start address, etc. For convenient implementation of these settings during installation and service there is the option of an interface between the fitting and an installation control element having the specific characteristic that communication between control element and the fitting consists of key and display information and therefore not parameter index and values, for example. Key information in this sense is therefore null or a bit, depending on whether a switch is opened or closed, and in the case of display information, whether a display segment or display point is ON or OFF. This, as a matter of fact, has the advantage that the fittings and installation equipment do not have to carry the burden of keeping track of the options of all the various software versions over time. The aspect described here can be formulated as a lighting system comprising one or more lighting units, wherein driving of the lighting units, for example via a network, takes place by means of instructions for presenting an operational status of a switch and/or an operational status of a display segment or display point.

Figure 18:
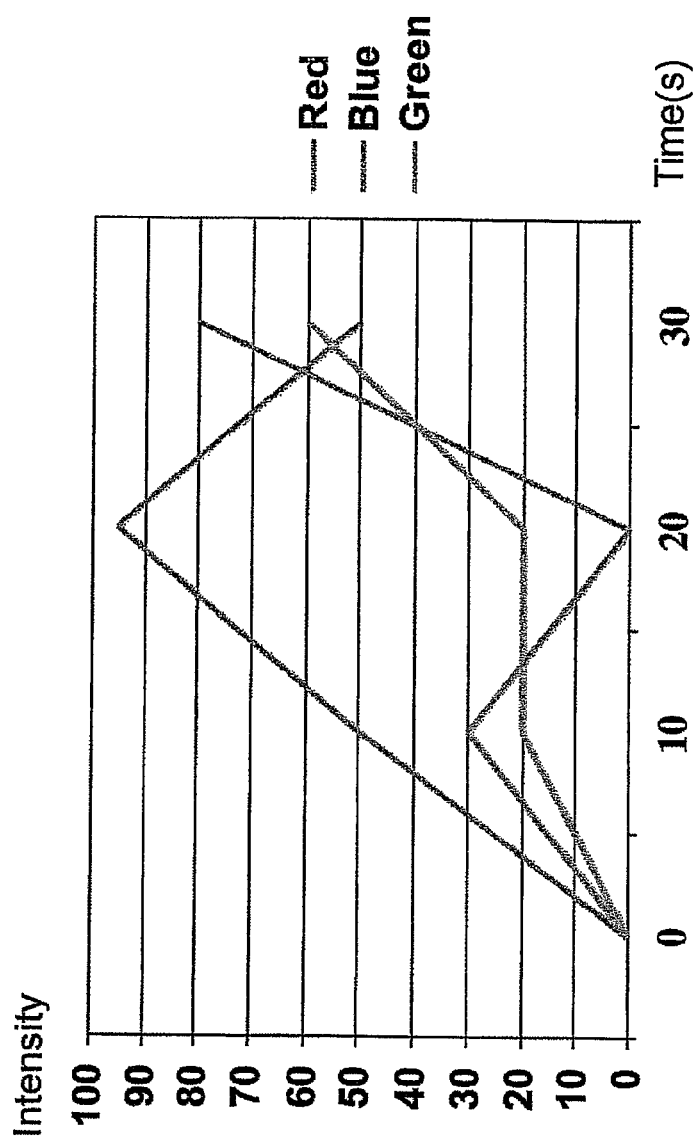
FIG. 18 shows a time diagram of an intensity profile according to an aspect of the invention.

To achieve cost-effective implementation, within a fitting of a local show controller (master) it is necessary to provide an efficient description of a lightshow. The use of DMX customarily requires up to 512 bytes per 20 ms show, in other words far too high a load on memory and processor for a simple application as customary in light fittings. In the case of communication via the electric mains it also represents far too high a bandwidth. With light fittings it is more a matter of slow, but synchronized changes in atmosphere and limited shows such as running lights etc. One idea is to define a show that can be loaded into light fittings, by means of a scripted and parameterized sequence description. FIG. 18 gives an example of an RGB scene from 0 to 30 seconds. In the classical DMX case, the bandwidth required is 30 seconds*3 bytes (R+G+B value)*50 Hz update frequency=4500 bytes over 30 seconds. The same sequence can be defined as follows with the aid of a parametric script:

SET R=0, B=0, G=0
MOVE TO R=50, B=30, G=20 IN T=10
MOVE TO R=90, B=0, G=20 IN T=10
MOVE TO R=50, B=80, G=60 IN T=10

A realistic assumption for the size of this script is that a command requires 1 byte, the abovementioned script then being about 20 bytes compared with the 4500 for DMX standard. Should the scene have to be repeated (a REPEAT script command), the gain would be multiplied. By means of a computer program, a lightshow designer is able to define a show which then, by means of a compiler and an optimizer (compact encoding) provides as compact as possible a parametric and scripted description which can sent to the fittings, for execution, by means of a computer link. The aspect described here can be formulated as a lighting system comprising one or more lighting units, wherein driving of the lighting units, for example via a network, takes place by means of instructions in a parametric script.

What is claimed is:

1. Method of driving, by means of single power supply, a number of high-power light-emitting diodes (LEDs), said number of LEDs being divided into two or more groups, each group being separately energizable, said method comprising:
   a) energizing or de-energizing a supply current from the power supply into a first one of the groups;
   b) waiting a predetermined wait time period;
   c) repeating step a) and b) for a second one of the groups; wherein the waiting during the predetermined wait time period establishes a minimum time interval between each load change of the power supply to ensure that the power supply is stabilized before a following one of the groups is energized or de-energized; and
   d) determining prior to step a), a sequential order by classifying the groups on the basis of a rising or falling desired average current; and
   wherein step c) comprises:
   c1) performing steps a) and b) in the energization sequential order for each of the groups to be energized
   wherein, prior to step d), among the groups a subset comprising groups is excluded from step d) and step c1); and
   c2) wherein it is determined, after energization according to c1), whether a remaining time up to a next de-energization of one of the groups energized at c1) is at least two wait time periods longer than a desired pulse duration of a group from the subset;
   c3) if this is the case, the energizing of the relevant group from the subset and de-energization thereof after the desired pulse duration has elapsed; and
   c4) the repeating of step c2) and c3) as long as not all the groups from the subset have been ON during the desired pulse duration.

2. Method according to claim 1, wherein the wait time period corresponds to a rise time or fall time of the power supply in the event of a single group being energized.

3. Method according to claim 1, wherein the de-energization of an energized group takes place in accordance with a desired average current in the energized group.

4. Method according to claim 1, wherein the subset comprises the groups whose desired pulse duration is shorter than a total number of groups multiplied by the wait time period.

5. Method according to claim 1 wherein, in the event of one or more groups from the subset remaining after all the groups energized at c1) have been de-energized, the remaining groups are turned ON in accordance with step a) and b) for the desired pulse duration.

6. Method according to claim 1, wherein a magnitude of the supply current of the power supply is greater than a maximum peak current of a combination of the LEDs in the group.

7. Method according to claim 1, wherein a point of time of energizing and/or deenergizing of the groups is further determined by means of one or more modulation techniques among pulse width modulation (PWM), frequency modulation (FM), pulse code modulation (PCM) and time division modulation (TDM).

8. Method according to claim 1, wherein the power supply comprises a switching power supply.

9. Method according to claim 8, wherein control of the switching power supply is synchronized with actuation of the groups.

10. Method according to claim 1, further comprising the transmission of a desired ON time, intensity or actuation time by means of a digital communications interface.

11. Method according to claim 10, wherein the intensity transmitted via the interface comprises logarithmic coding.

12. Method according claim 1, wherein each group is connected to an actuation element for energizing the connected group of LEDs and each actuation element is connected to a control unit, and wherein the method further comprises:
   controlling at least one actuation element for energizing or de-energizing the group of LEDs connected to said actuation element.

13. Method according to claim 12, wherein the control unit is provided with a time control element, and control of an actuation element comprises actuation of a single actuation element within the predetermined wait time period.

14. Method according to claim 13, wherein said wait time period corresponds to a rise time or fall time of the power supply in the event of an LED group being actuated.

15. Method according to claim 1, further comprising the derating or switching off of the power supply to provide no supply current if each group of LEDs is de-energized.

16. Method according to claim 1, wherein an LED from said two or more groups of LEDs is fed a current which corresponds to the maximum peak current for the LED during a first period, said first period having a maximum duration such that the average current over a predetermined second period, which comprises said first period, does not exceed a maximum average current for the LED.

17. Method of driving, by means of single power supply, a number of high-power light-emitting diodes (LEDs), said number of LEDs being divided into two or more groups, each group being separately energizable, said method comprising:
   a) energizing or de-energizing a supply current from the power supply into a first one of the groups;
   b) waiting a predetermined wait time period; and
   c) repeating step a) and b) for a second one of the groups; wherein the waiting during the predetermined wait time period establishes a minimum time interval between each load change of the power supply to ensure that the power supply is stabilized before a following one of the groups is energized or de-energized;
   a2) de-energizing a group energized previously by means of step a) simultaneously with energizing by means of step a) of a subsequent one of the groups;
   d) dividing a cycle for energizing and de-energizing the groups into a number of equal portions, the number being equal to the number of groups; and
   a3) energizing a first one of the groups at the start of one of the portions of the cycle; and wherein step a2) comprises:
   a4) energizing a second one of the groups at the start of another portion of the cycle, the first group being de-energized simultaneously with energization of the second group.

18. Method according to claim 17, further comprising the steps of:
   determining a desired ON time in each cycle by means of one or more of the modulation techniques from the group;

turning ON, in accordance with steps a3) and a4), one or more of the groups during one or more portions of the cycle.

19. Method according to claim 18, further comprising the steps of:
    turning one or more of the groups ON and OFF by means of steps a) and b) during one of the parts of the cycle, wherein each of the groups is assigned a different part of the cycle.

20. Method of driving, by means of single power supply, a number of high-power light-emitting diodes (LEDs), said number of LEDs being divided into two or more groups, each group being separately energizable, said method comprising:
    a) energizing or de-energizing a supply current from the power supply into a first one of the groups;
    b) waiting a predetermined wait time period;
    c) repeating step a) and b) for a second one of the groups; wherein the waiting during the predetermined wait time period establishes a minimum time interval between each load change of the power supply to ensure that the power supply is stabilized before a following one of the groups is energized or de-energized; and
    d) maintaining, during a proportionately longer period, one of the groups in an energized state over a period during which there is a low incidence of the group in question being energized for a proportionately shorter time.

21. Method of driving, by means of single power supply, a number of high-power light-emitting diodes (LEDs), said number of LEDs being divided into two or more groups, each group being separately energizable, said method comprising:
    a) energizing or de-energizing a supply current from the power supply into a first one of the groups;
    b) waiting a predetermined wait time period;
    c) repeating step a) and b) for a second one of the groups; wherein the waiting during the predetermined wait time period establishes a minimum time interval between each load change of the power supply to ensure that the power supply is stabilized before a following one of the groups is energized or de-energized;
    d) measuring a light intensity by means of a photosensor; and
    e) providing a feedback by using the measured light intensity to adjust the magnitude of the supply current of the power supply or to adjust an actuation time of a group.

22. Method according to claim 1, further comprising the step of actuating one or more of the groups as a function of a modulating signal.

* * * * *

UNITED STATES PATENT AND TRADEMARK OFFICE
CERTIFICATE OF CORRECTION

| | | |
|---|---|---|
| PATENT NO. | : 8,207,691 B2 | Page 1 of 1 |
| APPLICATION NO. | : 11/910755 | |
| DATED | : June 26, 2012 | |
| INVENTOR(S) | : Machiel Slot et al. | |

It is certified that error appears in the above-identified patent and that said Letters Patent is hereby corrected as shown below:

At (74) of the cover page, replace "Hoffman & Baron, LLP" with --Hoffmann & Baron, LLP--.

At column 1, line 51, replace "brightness and cc lour" with --brightness and colour--.

At column 2, line 5, replace "relatively bully owing" with --relatively bulky owing--.

At column 7, line 32, replace "preferable to mike" with --preferable to make--.

At column 14, line 36, replace "simultaneously ( ) in combination" with --simultaneouosly ON in combination--.

At column 14, line 57, replace "and the a intensity" with --and then the intensity--.

At column 15, line 43, replace "standard. DXM is based" with --standard DMX is based--.

At column 17, line 13, replace "are all requires to have" with --are all required to have--.

Signed and Sealed this
Fourth Day of September, 2012

David J. Kappos
*Director of the United States Patent and Trademark Office*

UNITED STATES PATENT AND TRADEMARK OFFICE
CERTIFICATE OF CORRECTION

PATENT NO. : 8,207,691 B2
APPLICATION NO. : 11/910755
DATED : June 26, 2012
INVENTOR(S) : Machiel Slot et al.

Page 1 of 1

It is certified that error appears in the above-identified patent and that said Letters Patent is hereby corrected as shown below:

In the Specifications:

At column 14, line 36, replace "simultaneouosly ON in combination" with --simultaneously ON in combination--.

Signed and Sealed this
Fourteenth Day of May, 2013

Teresa Stanek Rea
*Acting Director of the United States Patent and Trademark Office*